(12) United States Patent
Altaye et al.

(10) Patent No.: US 11,023,149 B1
(45) Date of Patent: Jun. 1, 2021

(54) DOUBLY MAPPED CLUSTER CONTRACTION

(71) Applicant: EMC IP Holding Company LLC, Hopkinton, MA (US)

(72) Inventors: Yohannes Altaye, Dumfries, VA (US); Mikhail Danilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/779,180

(22) Filed: Jan. 31, 2020

(51) Int. Cl.
*G06F 12/00* (2006.01)
*G06F 3/06* (2006.01)

(52) U.S. Cl.
CPC .......... *G06F 3/0631* (2013.01); *G06F 3/0608* (2013.01); *G06F 3/0689* (2013.01)

(58) Field of Classification Search
CPC .............................. G06F 3/0608; G06F 3/0689
USPC .......................................................... 711/114
See application file for complete search history.

(56) References Cited

U.S. PATENT DOCUMENTS

| | | | | |
|---|---|---|---|---|
| 8,751,740 B1* | 6/2014 | de Forest | ............. | G06F 3/0665 711/114 |
| 9,430,286 B2* | 8/2016 | Volvovski | ................ | G06F 9/50 |
| 9,864,527 B1* | 1/2018 | Srivastav | ................ | G06F 3/065 |
| 10,839,321 B2* | 11/2020 | Eder | ...................... | G06Q 40/00 |
| 10,846,003 B2* | 11/2020 | Danilov | ................ | G06F 3/0631 |
| 10,866,766 B2* | 12/2020 | Danilov | ................ | G06F 3/0608 |
| 10,880,040 B1* | 12/2020 | Danilov | ................ | G06F 9/463 |
| 2014/0089564 A1* | 3/2014 | Liu | ..................... | G06F 12/0246 711/103 |
| 2020/0026810 A1* | 1/2020 | Subramaniam | ..... | G06F 9/45558 |
| 2020/0133586 A1* | 4/2020 | Danilov | ................ | G06F 3/0604 |
| 2020/0241759 A1* | 7/2020 | Danilov | ................ | G06F 3/065 |

* cited by examiner

*Primary Examiner* — Viet Q Nguyen
(74) *Attorney, Agent, or Firm* — Amin, Turocy & Watson, LLP

(57) ABSTRACT

Contraction of a doubly mapped redundant array of independent nodes, e.g., a doubly mapped cluster, is disclosed. Different mappings of data for a doubly mapped cluster corresponding to different uses of computing resources. Where a computing resource parameter indicates the computing resource is underutilized, an alternative mapping of the doubly mapped cluster can be undertaken. The alternative mapping can better utilize the computing resources. The contraction of the doubly mapped cluster can maintain access to stored data. The contraction can preserve data protection set integrity. The contraction can result in the doubly mapped cluster comprising fewer mapped nodes after the contraction but can avoid wholesale moving of corresponding data stored in a real cluster. As such, contraction of a doubly mapped cluster can be distinct from scaling-in of a doubly mapped cluster.

20 Claims, 10 Drawing Sheets

FIG. 4

DOUBLY MAPPED CLUSTER CONTRACTION

TECHNICAL FIELD

The disclosed subject matter relates to data storage and, more particularly, to mapped storage via at least one portion of a real storage device of a real node of a real storage cluster, wherein a mapping can be updated based on a computing resource parameter.

BACKGROUND

Conventional data storage techniques can store data in one or more arrays of data storage devices. As an example, data can be stored in an ECS (formerly known as ELASTIC CLOUD STORAGE) system, such as is provided by DELL EMC. An example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however physically apportioning smaller groups, e.g., fewer nodes, less disks, smaller disks, portions of disk(s), etc., can be inefficient in regards to processor, storage, memory, network resources, etc., e.g., computer resource usage, to support these smaller groups.

BRIEF DESCRIPTION OF DRAWINGS

FIG. 4 is an illustration of an example system that can facilitate contraction of a doubly mapped cluster via remapping of the doubly mapped cluster, in accordance with aspects of the subject disclosure.

DETAILED DESCRIPTION

Figure 1:
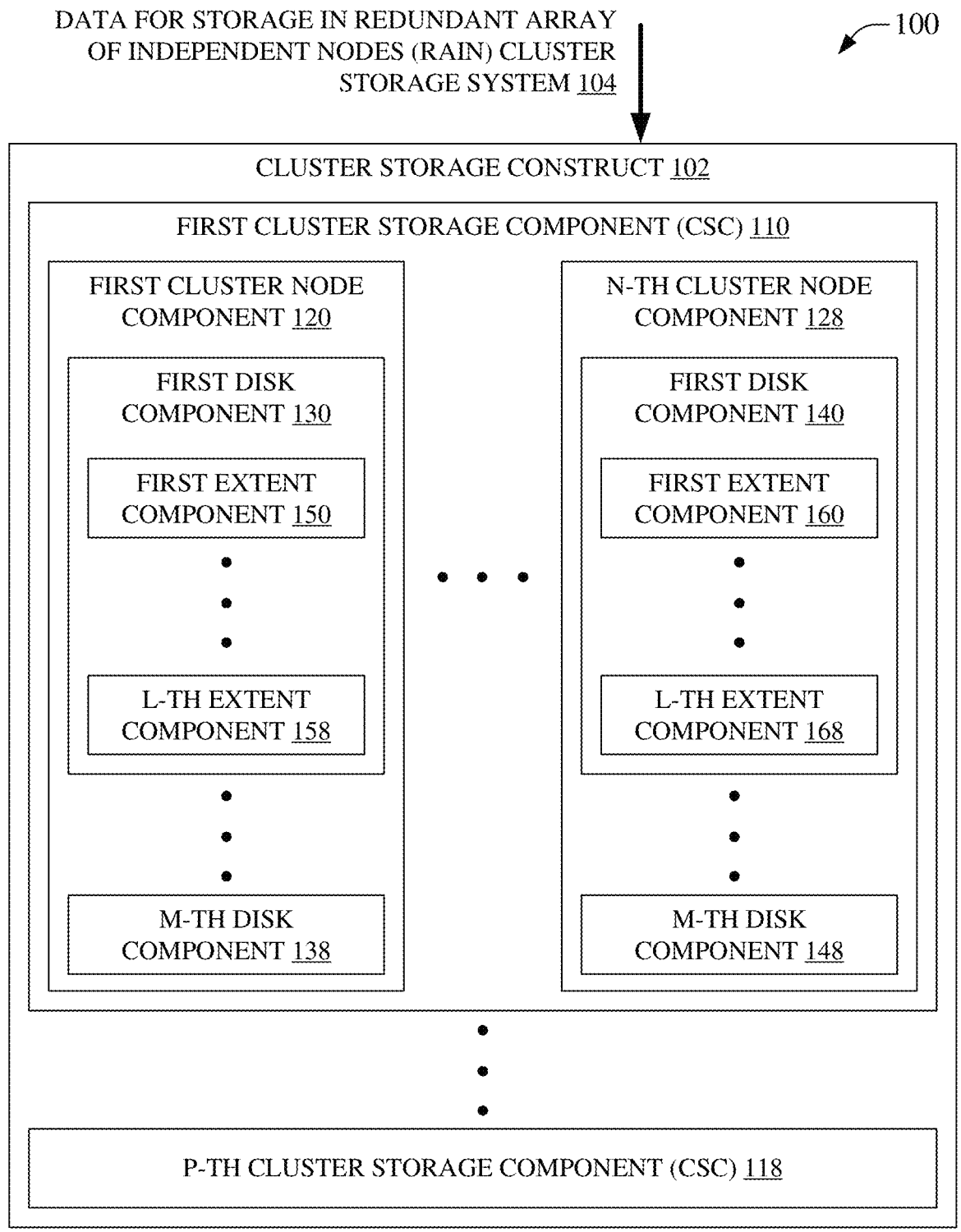
FIG. 1 is an illustration of an example system that can facilitate data storage at a real node according to a doubly mapped RAIN storage scheme, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices, hereinafter a cluster, real cluster, cluster storage construct, etc., as compared to a logical cluster, hereinafter a 'mapped' cluster, etc. As an example, data can be stored in an ECS system such as is provided by DELL EMC. The example ECS system can comprise data storage devices, e.g., disks, etc., arranged in nodes, wherein nodes can be comprised in an ECS cluster. A data storage device can comprise one or more extent, wherein the sum of the extents of a data storage device represents the storage capacity of the data storage device, e.g., a 16 TB disk can comprise 128 extents, wherein each of the 128 extents can store approximately 125 GB of data. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger physical groups, thereby facilitating efficient computer resource usage, e.g., providing smaller logical/mapped groups, via larger physical/real groups, wherein the mapped groups can be used more optimally than a real group for storing smaller amounts of data therein.

Figure 10:
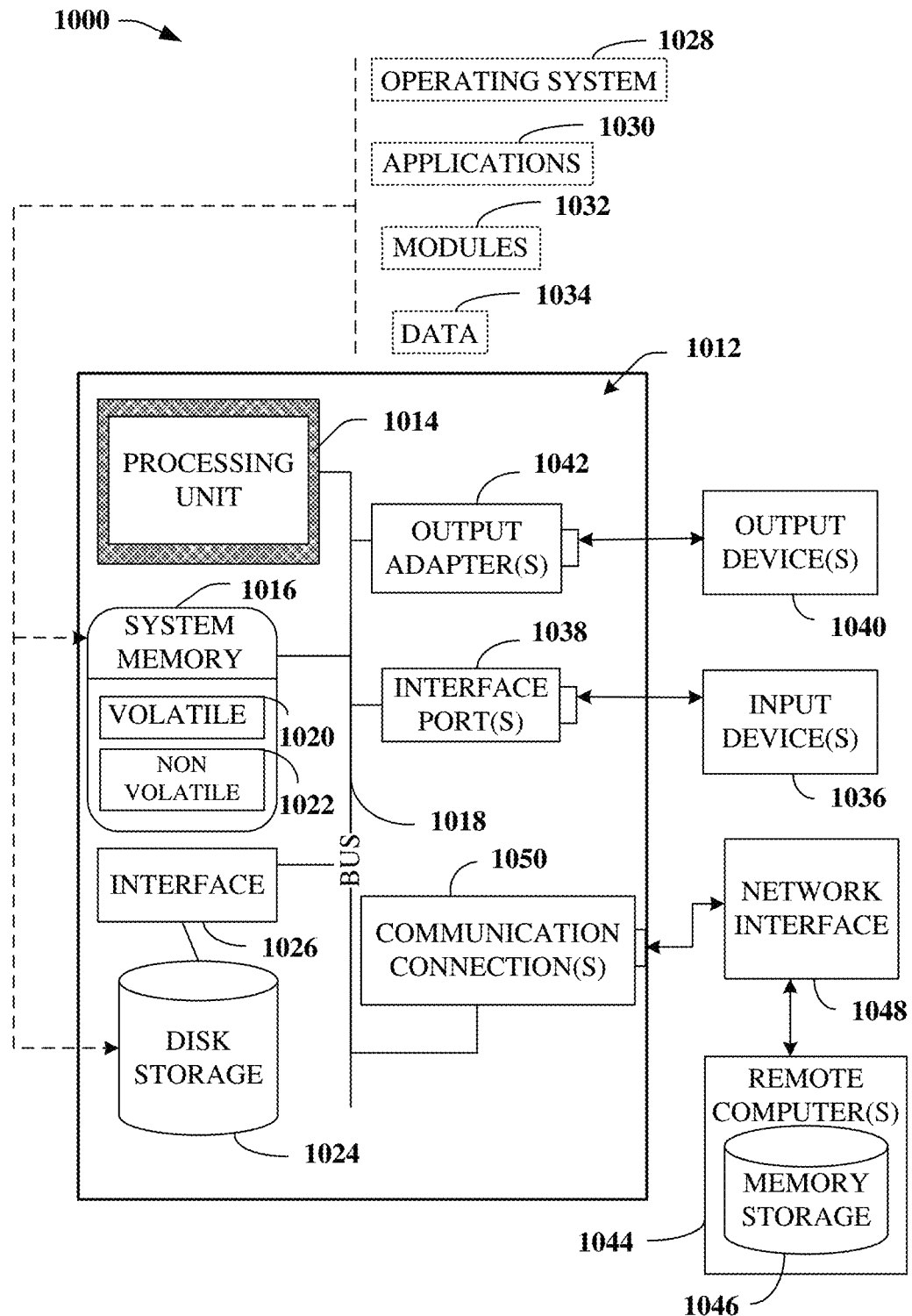
FIG. 10 illustrates an example block diagram of a computing system operable to execute the disclosed systems and methods in accordance with an embodiment.

A real cluster(s) can comprise real nodes, and the real nodes can comprise real data storage devices, which in turn can comprise extents, e.g., real extents of real disks of real nodes. Interaction with, management of, etc., the extents selected to store stored via a mapped node can employ computing resources, e.g., a processor(s), memory(ies), network interface(s), user interface(s), etc., such as are illustrated at FIG. 10, etc. A real node can be a discrete hardware node that comprises real storage devices, for example a real node can comprise a rack mounted controller interacting with M hard disks, for example in a rack that can be separate from another real node that can comprise a second rank mounted controller and other real storage devices. The storage devices of these nodes can be divided into extents to enable more granular use of memory than would be experienced with entire storage devices, e.g., a storage device can be divided into L extents, etc. In an embodiment, a real node can execute operations related to control of the real node, for example, managing data storage space provided by some of the example L extents of the example M hard disks, of the example N real nodes of an example real cluster, etc. Further, a real node can execute an instance of a mapped cluster storage service (MCSS) that can enable the virtualization of real storage space into 'doubly mapped' clusters that can span real extents of real disks of real nodes of a real cluster(s), e.g., interaction between MCSS instances executing on different real node computing resources can enable data interaction via a doubly mapped cluster comprising mapped nodes comprising mapped disks that store data via real extents of real disks of real nodes of real clusters. A doubly mapped cluster can therefore map to real extents of real disks of a real nodes of a real cluster, while typically a mapped cluster can map to real disks of real nodes of a real cluster.

In an embodiment of the presently disclosed subject matter, a doubly mapped redundant array of independent nodes, hereinafter a doubly mapped RAIN, doubly mapped cluster, etc., can provide data redundancy that, in an aspect, can allow for failure of a portion/extent of one or more mapped disks, one or more mapped disks, one or more mapped nodes, and/or one or more mapped clusters, etc., without loss of access to stored data; can allow for removal/addition of one or more mapped extents, mapped disks, mapped nodes, etc., from/to a mapped cluster without loss of access to stored data; etc. As an example, a doubly mapped cluster can comprise mapped extents of mapped disks of mapped nodes having a data redundancy scheme analogous to a redundant array of independent disks (RAID) type-6, e.g., RAID6, also known as double-parity RAID, etc., wherein employing a double mapping topology and two parity stripes on each mapped disk/node can allow for two mapped extent/disk/node failures before any data of the doubly mapped cluster may become less accessible, etc. In other example embodiments, a doubly mapped cluster can employ other double mapping topologies and parity techniques to provide data redundancy, e.g., analogous to RAID0, RAID1, RAID2, RAID3, RAID4, RAID5, RAID6, RAID0+1, RAID1+0, etc., wherein a doubly mapped disk/node of a mapped cluster can comprise one or more mapped extents, disks, etc., and the mapped extents can be loosely similar to a disk in a RAID system. Unlike RAID technology, an example doubly mapped RAIN system can provide access to more granular storage in, for example, very large data storage systems that can often be on the order of terabytes, petabytes, exabytes, zettabytes, or even larger, because each doubly mapped disk, mapped node of the instant disclosure can generally comprise a plurality of mapped extents, mapped disks, etc., unlike conventional RAID technologies.

In an embodiment, software, firmware, etc., can hide an abstraction doubly mapping nodes in a doubly mapped RAIN system, e.g., a group of doubly mapped nodes can appear to be a contiguous block of data storage even where, for example, it can be embodied via multiple extents of one or more real disks, multiple real groups of hardware nodes, multiple real clusters of hardware nodes, multiple geographic locations, etc. For a given real cluster, e.g., real RAIN, that is N real nodes wide, M real disks deep, and L real extents high, a doubly mapped cluster, e.g., a doubly mapped RAIN, can consist of up to N' mapped nodes that each manage up to M' mapped disks employing as many as M'×L' real extents, e.g., a doubly mapped RAIN can store data on up to N×M×L extents of a real cluster, although it can be common that the real cluster can support multiple doubly mapped RAINs that can each use fewer than the total number of extents of the real cluster wherein the sum of the participating extents supporting all of the multiple doubly mapped RAINs does not exceed the total number of extents of the real cluster. Accordingly, in an embodiment, one example doubly mapped node of size X can comprise mapped disks corresponding to one or more real extents of one or more real disks of one or more real nodes of one or more real clusters, wherein the size of available storage space of the one or more real clusters is greater than or equal to X. Similarly, in an embodiment, extents of real disk(s) of real node(s) of real cluster(s) can readily be managed by a mapped node(s) of a doubly mapped cluster(s).

Accordingly, in an embodiment, one doubly mapped disk can be generally expected to manage mapped extents constituted from different real disks of a real node(s) of a real cluster(s). Similarly, in an embodiment, portions of real disks of a real node can be expected to be managed by doubly mapped disks of a mapped RAIN cluster(s). In some embodiments, a doubly mapped cluster can be forbidden from using two real disks of one real node, can be forbidden from using two real extents of one real disk, etc., which can harden the mapped RAIN cluster against a failure of a real node, a real disk, etc., that may otherwise compromise stored data. Hereinafter, a portion of a real disk can be comprised in a real node that can be comprised in a real cluster and, furthermore, a portion of the real disk can correspond to a portion of a mapped disk, a doubly mapped disk can comprise one or more extents of one or more real disks, a doubly mapped node can comprise one or more disks of one or more real nodes, a doubly mapped cluster can comprise one or more nodes of one or more real clusters, etc., and, for convenience, the term RAIN can be omitted for brevity, e.g., a doubly mapped RAIN cluster can be referred to simply as a doubly mapped cluster, a doubly mapped RAIN node can simply be referred to as a doubly mapped node, a doubly mapped RAIN disk can be referred to simply as a doubly mapped disk, etc., wherein 'doubly mapped' is intended to convey that the doubly mapped disk/node/cluster/etc., is an abstraction of real storage space that is distinct from a real node and the corresponding real physical hardware component(s) of the real node, e.g., while data is actually stored on a real cluster/node/disk/extent, the data storage can abstracted to appear as being stored in a mapped cluster/node/disk/extent such that one or more mapped cluster/node/disk/extent can be 'built on top' of a real cluster/node/disk/extent. As an example, a data storage customer can use a doubly mapped cluster for data storage whereby the storage data is actually stored in various real data storage locations of a real data storage system, e.g., a real cluster, etc., according to a logical mapping between the real cluster and the doubly mapped cluster. This example can enable the doubly mapped cluster to have more granular data storage than in conventional allocation of storage space from real clusters.

In some embodiments, a rule can be employed in allocating a doubly mapped cluster. As an example, according to a data loss protection rule, etc., a doubly mapped cluster can be prohibited where it would employ two extents of one real disk in different mapped disks of one doubly mapped RAIN, e.g., this can protect against loss of one real disk from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be best practice to prohibit doubly mapped clusters that risk this type of data loss exposure via employing two extents of one real disk in different mapped disks of one doubly mapped RAIN. As another example, according to another data loss protection rule, etc., a doubly mapped cluster can be prohibited where it would employ two real disks of one real node in different mapped nodes of one doubly mapped RAIN, e.g., this can protect against loss of one real node from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be a best practice to prohibit doubly mapped clusters that risk this type of data loss exposure via employing two real disks of one real node in different mapped disks of one doubly mapped RAIN. In other embodiments, a data loss protection rule can correspond to other mapped cluster schema to offer protection against the loss of more or less mapped nodes, e.g., in some embodiments where the mapped cluster redundancy is designed to withstand a loss of two mapped nodes, the related data loss protection rule can allow for one real node to support mapped disks from two mapped nodes of the same mapped cluster. It is noted that all such data loss protection rules are considered within the scope of the present disclosure even where not explicitly recited for the sake of clarity and brevity.

In an embodiment, storage of data via a mapped cluster can be via a real cluster, e.g., the mapped cluster can be of size N' mapped nodes by M' mapped disks each comprising up to L' mapped extents, and the real cluster can be N real nodes by M real disks comprising up to L extents per real disk in size, where N'=N, M'=M, and L'=L. In other embodiments, N' can be less than, or equal to, N, M' can be less than, or equal to, M, and/or L' can be less than, or equal to, L. It will be noted that in some embodiments, M' can be larger than M, e.g., where the mapping of M real disks into M' mapped disks portions comprises use of a part of one of the M disks, for example, 10 real disks (M=10) can be mapped to 17 mapped disk portions (M'=17), can be mapped to 11 mapped disk portions (M'=11), can be mapped to 119 mapped disk portions (M'=119), etc. It will be further noted that in some embodiments, L' can be larger than L, e.g., where a mapped disk comprises L(1)'+L(2)' . . . +L(M)' extents, for example, extents of two real nodes (N=2), each of 10 real disks (M=10), wherein each real disk comprises 12 extents (L=12), for a total of 240 real extents, can be mapped to an example mapped cluster having a mapped disk comprised of 18 real extents, e.g., one extent from each of nine real disks of the first real node and each of nine real disks of the second real node; ten extents of one real disk of the first real node and nine extents of another real disk of the second real node; ten extents of one real disk of the first real node and one extent of each of nine real disks of the second real node; etc. Numerous other permutations are possible in assigning extents of real disks to support mapped disks/nodes/clusters and all such permutations, combinations, etc., are within the scope of the subject disclosure even where not explicitly recited for the sake of clarity and brevity.

In some embodiments, the doubly mapped cluster can be smaller than the real cluster. Moreover, where the doubly mapped cluster is sufficiently small in comparison to the real cluster, the real cluster can accommodate one or more additional doubly mapped clusters. In an aspect, where doubly mapped clusters are smaller than a real cluster, the doubly mapped cluster can provide finer granularity of the data storage system. As an example, where the real cluster is 8×8×8, e.g., 8 real nodes by 8 real disks by 8 extents per real disk, then, for example, four doubly mapped 4×4×8 clusters can be provided, wherein each of the four doubly mapped 4×4×8 clusters is approximately ¼th the size of the real cluster. As a second example, given an 8×8×8 real cluster 64 doubly mapped 2×2×2 clusters can be provided where each doubly mapped cluster is approximately ¹⁄₆₄th the size of the real cluster. As a third example, for the 8×8×2 real cluster, 2 doubly mapped 4×8×2 or 8×4×2 clusters can be provided and each can be approximately ½ the size of the real cluster. Additionally, the example 8×8×8 or 8×8×2 real cluster can provide a mix of different sized doubly mapped clusters, for example one 8×4×8 doubly mapped cluster, one 4×4×8 doubly mapped cluster, and four 2×2×8 doubly mapped clusters; etc. In some embodiments, not all of the real cluster must be comprised in one or more doubly mapped cluster(s), e.g., an example 8×8×8 real cluster can comprise only one 2×4×2 doubly mapped cluster with the rest of the real cluster not (yet) being allocated into doubly mapped storage space. In a further aspect, L for each of the M disks ban be, but need not be, the same value, e.g., real disk 1 can be 10 extents, e.g., L(1)=10, real disk 2 can be 12 extents, e.g., L(2)=12, real disk 3 can be 10 extents, e.g., L(3)=10, real disk 4 can be 1 extent, e.g., L(4)=1, etc. Moreover, the different disks can be the same or different size, e.g., disk 1 can be 16 TB, disk 2 can be 512 GB, disk 3 can be 8 TB, etc. Similarly, different real nodes can be of the same or different sizes.

A doubly mapped RAIN can, in some embodiments, comprise a processor, a virtual processor executing on a real processor, a combination of real processors and virtual processors, etc., that can enable interaction with data "stored in a doubly mapped cluster," e.g., a data representation corresponding to real data stored on one or more real clusters. The data stored in a doubly mapped cluster can actually correspond to real data stored on an extent of extents of a disk(s) of a node(s) of a real cluster(s), but can be interacted with according to a logical relationship, e.g., to a representation said to be 'stored in the doubly mapped cluster.' As such, writing data into a logical address of the doubly mapped cluster can result in writing of the data into a physical data storage element addressed in the real cluster and an association between the doubly mapped cluster address and the real cluster address can be retained to allow operations with the data, e.g., via operations directed to the logical representation but performed on the real data. In an aspect, the retention of the real-to-mapped address relationship, e.g., doubly mapped data corresponding to the real data, etc., can be via nearly any technique, for example, via a mapping table, via a data structure, etc., and all such techniques are within the scope of the present disclosure. Additionally, the relationship is typically updatable, allowing, for example, movement of data at the real cluster to still relate to an unchanged doubly mapped address, allowing movement of the doubly mapped data to still relate to unmoved data at the real address, etc. As an example, where a node of a real cluster fails, the relationship to the doubly mapped address can be updated to associate a redundant duplicate of the data of the real cluster to be associated with the doubly mapped address, thereby allowing a user of the doubly mapped cluster to operate on the data without disturbance. As another example, moving data in a doubly mapped cluster environment can be decoupled from actually moving the data within the real cluster, e.g., the updated doubly mapped address can be affiliated with the unchanged real address, etc. As a further example, a failure of a doubly mapped node, which is not related to a failure of a real node, can be compensated for by providing access to the real data at the unhanged real cluster address via a redundant doubly mapped cluster node. Numerous other examples of doubly mapped RAIN technology are readily appreciable and are considered within the scope of the present disclosure even where not recited for clarity and brevity.

In some embodiments, metrics can be employed to guide storage of data of a mapped cluster in a real cluster. As an example, a first real node of a real cluster can comprise older hardware that may not perform as quickly, reliably, etc., as newer hardware of a second real node of the real cluster, e.g., which can be indicated in key performance indicator data for real node hardware, etc., whereby it can be desirable to more heavily burden the second real node based on the better performance in contrast to the first real node. Metrics can include processor factors such as count, speed, etc., memory factors such as an amount of memory, speed, throughput, etc., network factors such as bandwidth, cost, latency, reliability, etc., location, reliability, monetary cost, geopolitical factors, etc., hereinafter generally described as 'computing resource' metrics, parameters, factors, etc. Moreover, other aspects of the disclosed subject matter provide additional features generally not associated with real cluster data storage.

In some embodiments, a doubly mapped cluster can comprise storage space from more than one real cluster. In some embodiments, a doubly mapped cluster can comprise storage space from real nodes in different geographical areas. In some embodiments, a doubly mapped cluster can comprise storage space from more than one real cluster in more than one geographic location. As an example, a doubly mapped cluster can comprise storage space from a cluster having hardware nodes in a data center in Denver. In a second example, a doubly mapped cluster can comprise storage space from a first cluster having hardware nodes in a first data center in Denver and from a second cluster also having hardware nodes in the first data center in Denver. As a further example, a doubly mapped cluster can comprise storage space from both a cluster having hardware nodes in a first data center in Denver and a second data center in Denver. As a still further example, a doubly mapped cluster can comprise storage space from a first cluster having hardware nodes in a first data center in Seattle, Wash., and a second data center having hardware nodes in Tacoma, Wash. As yet another example, a doubly mapped cluster can comprise storage space from a first cluster having hardware nodes in a first data center in Houston, Tex., and a second cluster having hardware nods in a data center in Mosco, Russia. Accordingly, in an example, a real cluster can comprise data storage in a first data center located in Seattle, which can be subject to earthquakes, frequent violent political events, etc., and in a second data center located in Spokane, which can be less prone to earthquakes and political events, whereby spreading data, based on risks form earthquake and riots, can slightly favor a higher ratio of data storage in real nodes of the Spokane portion of the real cluster, e.g., more of the total data can be stored in Spokane than in Seattle because it can be less at risk while still spreading the data storage across real nodes located in both Seattle and Spokane. Numerous other examples are to be readily appreciated by one of skill in the art, and all such examples are considered within the scope of the present disclosure, even where not recited for the sake of clarity and brevity.

In some embodiments, use of computing resources by a doubly mapped cluster can change. As an example, a customer can have a first doubly mapped cluster but can begin interacting with a second cluster that can have improved performance, and correspondingly can have fewer interactions with the first doubly mapped cluster. In this example, computing resources allocated to operating the first doubly mapped cluster can be underutilized. In an aspect, in regard to this example, the data of the first doubly mapped cluster can be moved to the second cluster, but this typically is a computing resource intensive process. In another aspect, again in regard to this example, the first doubly mapped cluster can continue to be used despite the underutilization, which can be viewed as wasting computing resources. In a further aspect regarding this example, the first doubly mapped cluster can be abandoned where loss of the data stored on the first doubly mapped cluster is acceptable. Each of these options is associated with a potentially substantial negative consequence, e.g., high computing resource cost of moving data, wasting computing resources, abandoning data, etc. As such, it can be desirable to keep the data without incurring either a wasting/expending significant computing resources. The presently disclosed subject matter illustrates contraction of a doubly mapped cluster that can facilitate less wasteful expenditure of computing resources without needing to move all of the data, e.g., from the example first doubly mapped cluster to the second cluster, etc., and without needing to abandon data of the first doubly mapped cluster.

Contraction of a doubly mapped cluster can, in an aspect be distinct from scaling-in of a doubly mapped cluster. Scaling-in can relate to moving data between real storage locations corresponding to the doubly mapped cluster to free the real node and allow the real node to be removed from use by the doubly mapped cluster. After scaling-in, a doubly mapped cluster can comprise fewer mapped nodes that can map to fewer real nodes. Moreover, in some limited instances, the doubly mapped cluster can remain unchanged other than being mapped to different real storage elements. However, in contrast to scaling-in, contraction of a doubly mapped node generally does not move data between real storage elements to free real nodes. A contracted doubly mapped cluster can have fewer mapped nodes that map to the same real storage elements as were used before the contraction. As such, this avoids heavily burdening computing resources to move large amounts of data between real nodes/clusters. Further, this allows the doubly mapped cluster to operate with less waste of computing resources, e.g., fewer MCSS instances due to fewer mapped nodes, etc. Moreover, the customer data is not abandoned.

In an aspect, contraction of a doubly mapped cluster can present issues in regards to maintaining an integrity of a protection set(s) associated with data storage. A protection set can harden access to data, e.g., protect access to the data, against the loss of a portion of a doubly mapped cluster, as is noted herein above. Where the topology of the doubly mapped cluster is contracted, the distribution of protection set fragments can be altered. Careless alteration of the distribution of protection set fragments can lead to a potential for a data loss event. Accordingly, analysis of data protection set fragmentation can be employed to contract a doubly mapped cluster in a manner that maintains the integrity of the data protection set. As an example, a protection set employing a 12+4 erasure coding scheme can be associated with sixteen fragments and can protect access to the data up to the loss of any four of those fragments. In this example, contraction of the doubly mapped cluster can be constrained to ensure that no more than four fragments are vulnerable against the loss of a mapped node of the doubly mapped cluster, e.g., no more than four fragments of each protection set would be at risk where a mapped node, or portion thereof, becomes less accessible. In an aspect, any protection set scheme can be germane to the instant disclosure and all such schema are considered within the scope of the instant disclosure even where not explicitly recited for the sake of clarity and brevity, e.g., a 10+2 erasure coding scheme protection set is just as easily protected as a 12+4 erasure coding scheme protection set, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate data storage at a real node of a doubly mapped RAIN storage system, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Moreover, each real storage device can comprise one or more extents. An extent can be a defined portion of the real storage device, e.g., a real disk can be logically divided into extents, and the extents can comprise data storage locations that can facilitate data operations according to the storage locations. It is noted that a disk of a stated size can typically comprise less than the stated size of useable storage, a common convention, wherein a portion of the stated size is generally reserved for operational overhead, e.g., a 4 TB drive may have less than 4 TB of useable storage where the drive uses a portion of the 4 TB for a basic input output system (BIOS), disk management system, etc. Accordingly, the extents of a disk can also differ from a precise division of the stated size for similar reasons. In an aspect, extents can be of a unit size, for example, an extent can be about 500 gigabytes (GB), such that a 5 terabyte (TB) disk can comprise 10 extents and an 8 TB disk can comprise 16 extents, again, as noted herein, the extents may not be exactly 500 GB due to some of the stated disk space being otherwise allocated for non-storage features, but the extents can each still be of the same unit size. As is noted hereinabove, in some embodiments, extents can be of other than a unit size without departing form the scope of the subject disclosure even where not discussed in more detail herein for the sake of clarity and brevity. Use of unit sized and/or non-unit sized extents, in some embodiments, can enable a real cluster to support doubly mapped clusters corresponding to extents of real disks, rather than whole real disks, wherein the doubly mapped cluster can employ part of a real disk, e.g., can correspond to part of the real disk. Moreover, an extent unit size can enable use of different sized real disks in the real cluster without complicating allocation of storage space in the doubly mapped cluster. As an example, in a singly mapped cluster, whole real disks can be mapped, e.g., a mapped disk can correspond to a whole real disk and, accordingly, it can be more complex to allocate a mapped cluster based on a real cluster having mixed whole disk sizes, for example, because this can result in different sizes of mapped disks that can complicate redundant data storage in the mapped cluster construct. In contrast, different sizes of real disks in a real cluster with doubly mapped cluster technology can be immaterial because the doubly mapped cluster can map equal sized extents and redundant data storage can therefore be less complex. As an example, if a real node comprises a 1 TB drive and an 8 TB drive, then a mapped node can comprise a 1 TB mapped drive and an 8 TB mapped drive which can complicate redundant storage because loss of one of the mapped drives can result in data loss unless more complex redundant data storage techniques are employed to preserve data in case of a lost mapped drive. In this example, if doubly mapped cluster technology is employed with a 1 TB extent size, then there can be 9 extents in the real drives and a doubly mapped cluster can comprise two four extent doubly mapped disks allowing for less complex data redundant storage techniques to be employed. Additionally, for this example, the granular size can be 9 TB in the singly mapped cluster, and can be as low as 2 TB in the doubly mapped cluster.

In system 100, cluster storage construct 102 can receive data for storage in a mapped cluster, e.g., data for storage in RAIN cluster storage system 104, etc., hereinafter data 104 for brevity. Data 104 can be stored by portions of the one or more storage devices of cluster storage construct 102 according to a logical mapping of the storage space, e.g., according to one or more doubly mapped clusters. In an aspect, a doubly mapped cluster can be a logical allocation of storage space comprised in cluster storage construct 102. In an embodiment, a portion, e.g., addressable storage element, of an extent of a real disk can be comprised in an extent of a real disk that can be comprised in a real node that can be comprised in a real cluster and, furthermore, an addressable storage element of the real cluster can correspond to a portion of a doubly mapped cluster, etc. Accordingly, in an embodiment, cluster storage construct 102 can support a doubly mapped cluster enabling data 104 to be stored on one or more addressable storage elements of an extent(s), e.g., first extent component 150 through L-th extent component 158, of a real disk, e.g., first disk component 130 through M-th disk component 138 of a real node(s) of a real cluster(s), e.g., first cluster node component 120 through N-th cluster node component 128 of a cluster storage component (CSC), e.g., first CSC 110 through P-th CSC 118, and correspond to a doubly mapped cluster schema. Whereas each disk comprises an extent(s), e.g., first disk component 130 comprises first extent component 150 through L-th extent component 158, first disk component 140 comprises first extent component 160 through L-th extent component 168, etc., the total number of extents of cluster storage construct 102 can be determined by summing the number of extents in each disk of each node of each cluster for all clusters, nodes, and disks, e.g., for a single cluster system, an 8×8×8 cluster can have 512 extents of a determined size. In an aspect, a mapped cluster control component, e.g., mapped cluster control component 220 of FIG. 2, etc., can coordinate storage of data 104 on storage elements of a real cluster of cluster storage construct 102 according to relationships between the mapped data storage space and the real data storage space, e.g., mapped cluster control component 220, etc., can indicate where in cluster storage construct 102 data 104 is to be stored, cause data 104 to be stored at a location in cluster storage construct 102 based on a mapping of the doubly mapped cluster, etc. In an embodiment, a doubly mapped cluster built on top of cluster storage construct 102 can correspond to one or more portions of one or more real cluster, e.g., to a portion of an extent of one or more disks of one or more nodes of one or more real clusters. Moreover, the mapped cluster can be N' nodes by M' disks by L' extents in size and the one or more real clusters of cluster storage construct 102 can be N nodes by M disks by L extents in size.

In some embodiments, a doubly mapped cluster can correspond to storage space from more than one real cluster, e.g., first CSC 110 through P-th CSC 118 of cluster storage construct 102. In some embodiments, a doubly mapped cluster can correspond to storage space from real nodes in different geographical areas. In some embodiments, a doubly mapped cluster can correspond to storage space from more than one real cluster in more than one geographic location. As an example, a doubly mapped cluster can correspond to storage space from a cluster having hardware nodes in a data center in Denver, e.g., where first CSC 110 is embodied in hardware of a Denver data center. In a second example, a doubly mapped cluster can correspond to storage space from a first cluster having hardware nodes in a first data center in Denver and from a second cluster also having hardware nodes in the first data center in Denver e.g., where first CSC 110 and P-th CSC 118 are embodied in hardware of a Denver data center. As a further example, a doubly mapped cluster can correspond to storage space from both a cluster having hardware nodes in a first data center in Denver and a second data center in Denver e.g., where first CSC 110 is embodied in first hardware of a first Denver data center and where P-th CSC 118 is embodied in second hardware of a second Denver data center. As a further example, a doubly mapped cluster can correspond to storage space from a first cluster having hardware nodes in a first data center in Seattle, Wash., and a second data center having hardware nodes in Tacoma, Wash., e.g., where first CSC 110 is embodied in first hardware of a first Seattle data center and where P-th CSC 118 is embodied in second hardware of a second Tacoma data center. As another example, a doubly mapped cluster can correspond to storage space from a first cluster having hardware nodes in a first data center in Houston, Tex., and a second cluster having hardware nods in a data center in Mosco, Russia e.g., where first CSC 110 is embodied in first hardware of a first Houston data center and where P-th CSC 118 is embodied in second hardware of a second Mosco data center.

In an aspect, a mapped cluster control component, e.g., 220, etc., can allocate storage space of cluster storage component 102 based on an indicated level of granularity. In an aspect, this indicated level of granularity can be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In an aspect, these types of information can be termed 'supplemental information', e.g., 222, etc., and said supplemental information can be used to allocate mapped storage space in a doubly mapped cluster and the corresponding space in a real cluster storage construct 102. In some embodiments, allocation can be unconstrained, e.g., any space of cluster storage component 102 can be allocated into a doubly mapped cluster. In other embodiments, constraints can be applied, e.g., a constraint can be employed by a doubly mapped cluster control component to select or reject the use of some storage space of cluster storage construct 102 when allocating a doubly mapped cluster. As an example, a first constraint can restrict allocating two doubly mapped clusters that each use a disk from the same real node because difficulty accessing the real node can result in effects on two doubly mapped clusters, a second constraint can restrict allocating two doubly mapped disks of one doubly mapped cluster from using extents from the same real disk because difficulty accessing the real disk can result in effects on the two doubly mapped disks. Other constraints can be readily appreciated, for example, based on a type of data redundancy schema, based on available/use storage space, based on network/computing resource costs, etc., and all such constraints are within the scope of the instant disclosure even where not recited for clarity and brevity.

In an embodiment, system 100 can enable contraction of doubly mapped cluster. Contraction can result in remapping of the doubly mapped cluster to real storage of system 100. In an aspect, this can occur without moving the real storage, e.g., the doubly mapped nodes can be contracted without needing to contract the physical storage of corresponding stored data. This can allow the stored data to remain accessible without burdening computing resources to move all of the contracted stored data between real extents while also enabling less waste of computing resources through management of fewer mapped nodes in the doubly mapped cluster.

Figure 2:
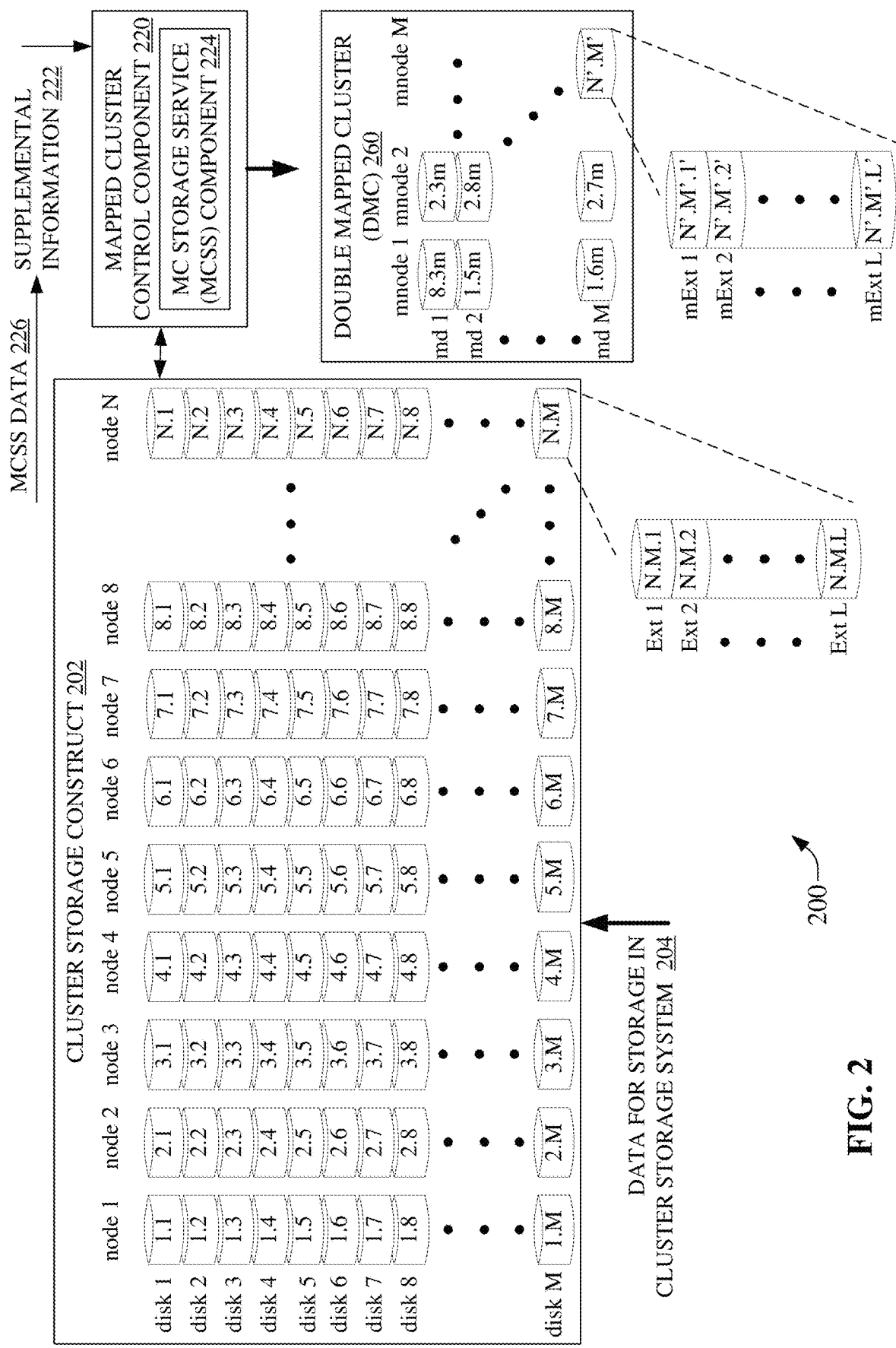
FIG. 2 is an illustration of an example system that can accommodate mapped clusters for data storage via a real node according to a doubly mapped RAIN storage scheme based on a mapping of mapped extents to portions of real disks, in accordance with aspects of the subject disclosure.

FIG. 2 is an illustration of a system 100, which can facilitate mapped clusters for data storage via a real node according to a doubly mapped RAIN storage scheme based on a mapping of mapped extents to portions of real disks, in accordance with aspects of the subject disclosure. System 200 can comprise cluster storage construct 202 that can be the same as, or similar to, cluster storage construct 102. Cluster storage construct 202 is illustrated at the disk and node-level for ease of illustration, e.g., disk 1.1 indicates disk 1 of node 1. As used herein, the disk, node, and extent can be typically depicted as N.M.L in real components, N'.M'.L' in mapped components, etc., such that, for example, data stored at 1.1.1 is stored at an addressable storage location of real node 1, real disk 1, real extent 1, data stored at 4'.3'.8' is stored "at" an addressable storage location corresponding to mapped node 4, mapped disk 3, mapped extent 8, etc. As is illustrated in system 200, cluster storage construct 202 can comprise N nodes of M disks, e.g., disk 1.1 to N.M, etc. Moreover, each of the M disks of the N nodes can comprise L extents, see the flyout of disk N.M of cluster storage construct 202 that comprises L extents, e.g., N.M.1 through N.M.L.

Mapped cluster control component 220 can be communicatively coupled to, or be included in, cluster storage construct 202. Mapped cluster control component 220 can allocate doubly mapped cluster (DMC) 260, which can logically embody storage comprised in cluster storage construct 202. In an embodiment, DMC 260 can be allocated based on supplemental information 222. As an example, supplemental information 222 can indicate a first amount of storage that can be needed, and mapped cluster control component 220 can determine a number of, and identity of, extents of disks of nodes of cluster storage construct 202 to meet the first amount of storage. Mapped cluster control component 220, in this example, can accordingly allocate the identified extents, disks, and nodes of cluster storage construct 202 as corresponding to doubly mapped nodes (mnode, mn, etc.), disks (mdisk, md, etc.), and extents (mextent, mExt, etc.) of DMC 260, e.g., extents of disk 8.3m can correlate to an allocation of extents of disk 8.3, . . . , extents of disk N'.M' can correlate to an allocation of disk N.M, etc. As such, similar to a real cluster, e.g., cluster storage construct 202, etc., DMC 260 can comprise mapped extents, for example, see flyout of doubly mapped disk N'.M' comprising mapped extents mExt 1 through mExt L, e.g., N'.M'.1' through N'.M'.L'.

In an aspect, mapped cluster control component 220 can comprise mapped cluster storage service (MCSS) component 224 that can cause an instance of a storage service, e.g., an MCSS instance, to be instantiated. The storage service can enable interaction with data stored via a mapped extent of a mapped disk of a mapped node, e.g., writing, reading, modifying, moving, copying, duplicating, deleting, freeing, etc., of data in a mapped cluster abstraction can be performed on data of a real disk of a real node of a real cluster via an instance of a storage service. Instantiation of the storage service for DMC 260 can be based on data relating to a topology of extents supporting DMC 260, affinity data, computing resource data, etc., which can be embodied in MCSS data 226 that can be comprised in supplemental information 222. In some embodiments, MCSS component 224 can be comprised in other components of system 200, other components of a storage system comprising system 200, etc., and can correspondingly receive MCSS data 226 appropriately, e.g., where MCSS data 226 may not be comprised in supplemental information 222, etc.

Mapped cluster control component 220 can facilitate storage of data 204, corresponding to data representations of DMC 260, in the allocated storage areas of cluster storage construct 202. As such, data 204 can be stored in a more granular storage space than would conventionally be available, e.g., conventionally all disks of a node can be committed to storage, e.g., a client device is conventionally 'given' a whole real node to use, even where the 1 to M disks available in the whole real node can far exceed an amount of storage space needed by the client device. As such, by mapping portions of extents of some disks from some nodes into DMC 260, a lesser amount of storage space can be made available to the client device, for example, rather than allocating a whole real node, a whole real disk, etc., under conventional technology, with doubly mapped RAIN technology a single extent of a single disk of a single node can be allocated, which can be significantly less storage space than the whole node, whole disk, etc. As an example, where a conventional storage cluster can allocate a minimum block of 1.2 petabytes (PB), for example in a conventional ECS storage system 1.2PB can be the minimum storage size associated with a whole real node, this can far exceed demands of a client device in many situations. Continuing the example, a singly mapped RAIN can allocate at a whole disk-level and can reduce the minimum storage size considerably where the real node is comprised of multiple real disks. Still further in the example, a doubly mapped RAIN can allocate storage at the extent level to provide still further granularity of storage space and reduce the minimum allocated space even beyond singly mapped RAIN technology where the real disk can comprise multiple extents. As an example, where storage can be related to storing a simple log file, storing the log file in 1.2PB of space can be an extremely inefficient use of space. Similarly, in this example, even storing the log file in several TB of disk space can be highly inefficient use of storage space. As such, allocation of storage space at the disk extent level can provide levels of granularity that are much more storage space efficient.

Figure 3:
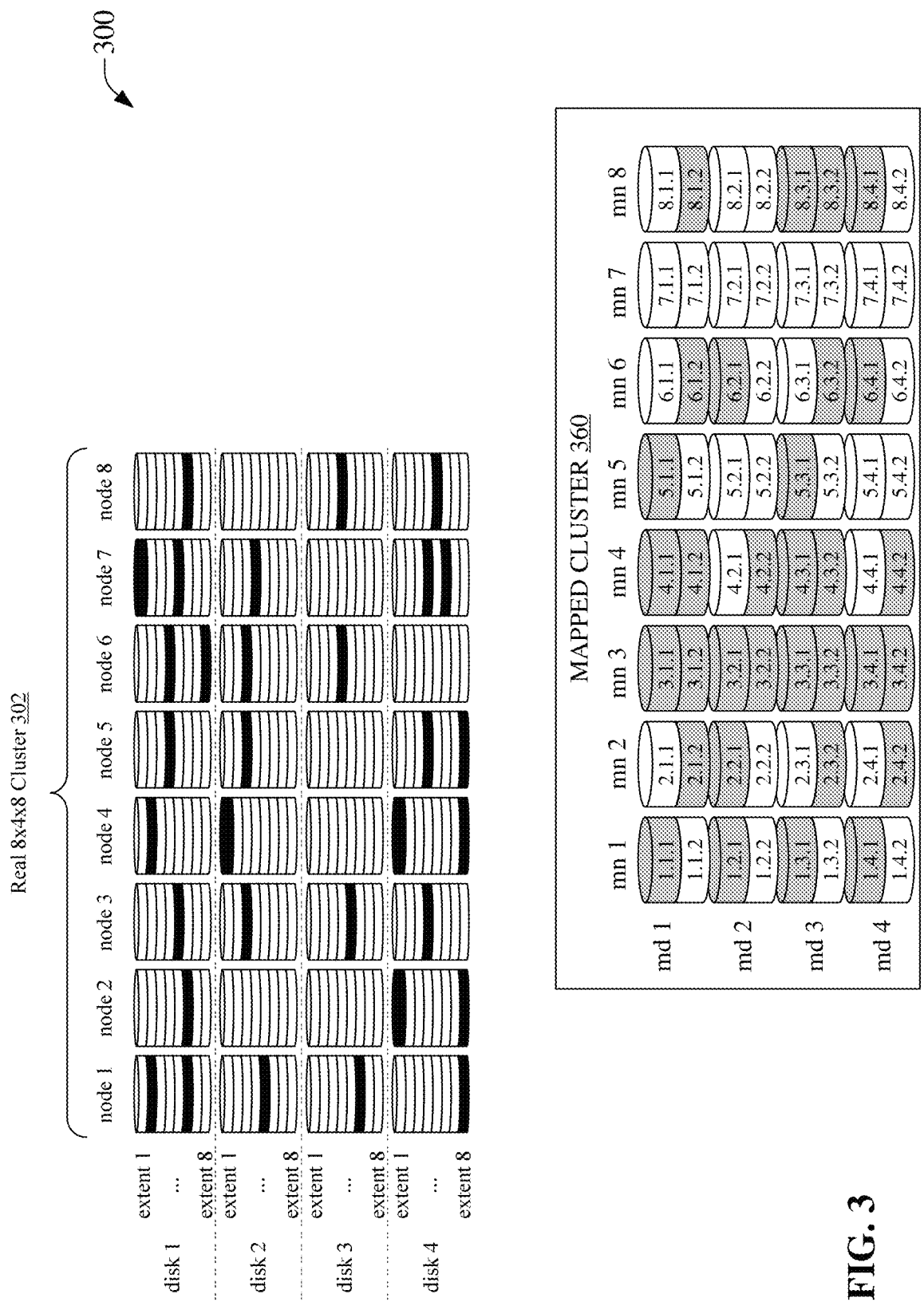
FIG. 3 is an illustration of an example system that can enable contraction of a doubly mapped cluster, in accordance with aspects of the subject disclosure.

FIG. 3 is an illustration of a system 300, which can facilitate contraction of a doubly mapped cluster, in accordance with aspects of the subject disclosure. System 300 can comprise real cluster 302 that can be the same as, or similar to, at least a portion of cluster storage construct 102, cluster storage construct 202, etc. As is illustrated for example in system 300, real cluster 302 can comprise eight real nodes, each of which can comprise four real disks, each of which can comprise eight extents, e.g., real cluster 302 can be an 8×4×8 cluster. Accordingly, real cluster 302 can comprise 256 extents.

System 300 can support a doubly mapped cluster, e.g., mapped cluster 360. Mapped cluster 360 can comprise eight mapped nodes, e.g., mn 1 through mn 8, that can each comprise four mapped disks, e.g., md 1 through md 4, that can each comprise two mapped extents, e.g., 1.1.1 through 1.1.2 for mn 1 at md 1, etc. Accordingly, the illustrated example doubly mapped cluster, e.g., mapped cluster 360, can comprise 64 mapped extents. In FIG. 3, mapped cluster 360 can 'store' data in the shaded extents, e.g., the data is physically stored in extents of real disks that correspond to the doubly mapped storage locations depicted as shaded extents in mapped cluster 360. In the illustrated example, half of the mapped extents can store data and the other half of the extents can be part of the doubly mapped cluster but not store any data.

In an aspect, instances of a mapped node storage service, e.g., an MCSS, expends computing resources in support of a doubly mapped cluster. As an example, each of the mapped nodes can be associated with a separate instance of a MCSS. In this example, the computing resources can consume computing resources to perform the eight MCSS instances. This can be wasteful. This can be seen in this example, by contrasting the MCSS for mn 3, which can be expending computing resources to manage the eight available extents comprised in mn 3 of which all eight can be used to store data, to the MCSS for mn 7, which can expend computing resources to also manage eight available extents comprised in mn 7 of which none are actually storing data. Similarly, the other mapped nodes of mapped cluster 360 can be seen as each supporting eight extents with different actual use levels. It can be desirable to run fewer MCSS instances to conserve computing resources. By remapping mapped cluster 360, the same number of extents can be managed by fewer mapped nodes and, correspondingly, fewer MCSS instances. In an embodiment, remapping can 'move' some occupied mapped extents from some mapped nodes to some unoccupied mapped extents of other mapped nodes. This can result in mapped nodes that do not support any occupied mapped extents. The unoccupied mapped nodes can, in some embodiments, then be removed from the doubly mapped cluster. Removing the unoccupied mapped node can correspond to terminating an associated MCSS instance. As an example, where mn 7 is to be removed from mapped cluster 360 because it comprises zero occupied mapped extents, an MCSS instance for mn 7 can be terminated, thus reducing the amount of computing resources used by mapped cluster 360. Contraction of example mapped cluster 360 can occur without needing to, for example, move the data corresponding to mapped extent 8.1.2 from a first real extent to a second real extent, e.g., the remapping can update the logical associations without needing to move the corresponding stored data between physical storage elements. It is noted that, in some embodiments, moving of data between real storage elements is allowable without departing from the scope of the instant disclosure, generally however, movement between real storage elements in contraction of a doubly mapped cluster can be less than moving all data of a mapped node between real storage locations, e.g., there can typically be some incidental movement between real storage locations of data stored in a mapped node undergoing contraction which is generally much less movement than moving all data of the mapped node between real storage elements, e.g., possibly moving some data fragments of a data protection set to preserve a data protection scheme, moving some data chunks but not others to maintain chunk diversity, etc., can occur in some instance of the disclosed subject matter without departing form the scope of the instant disclosure.

Figure 4:
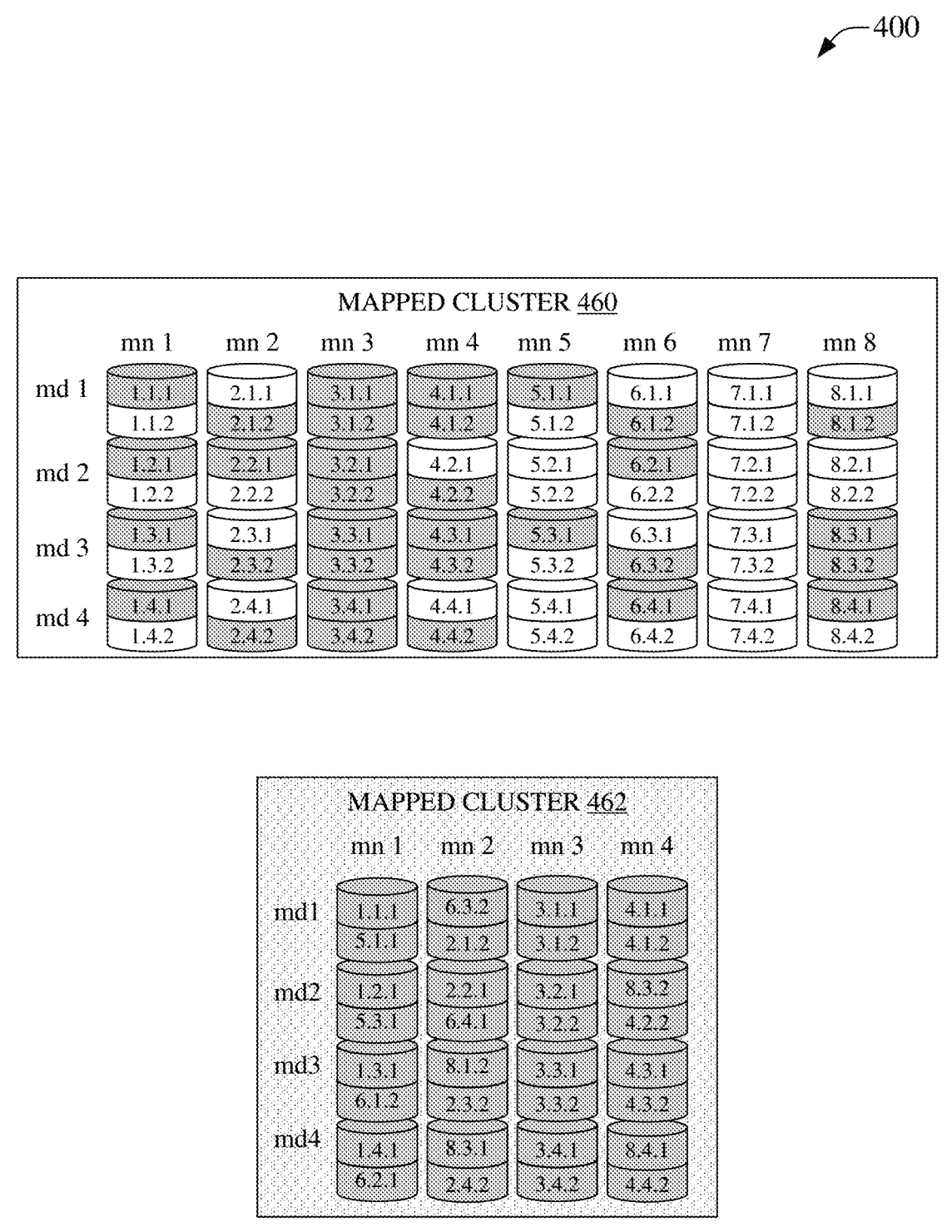

FIG. 4 is an illustration of an system 400 facilitating contraction of a doubly mapped cluster via remapping of the doubly mapped cluster, in accordance with aspects of the subject disclosure. System 400 can comprise a doubly mapped cluster, e.g., mapped cluster 460, that can be supported via a real cluster that can be the same as, or similar to, at least a portion of cluster storage construct 102, cluster storage construct 202, real cluster 302, etc. A doubly mapped cluster can comprise mapped nodes of mapped disks of mapped extents, for example as is illustrated for mapped cluster 460, eight mapped nodes, each of which can comprise four mapped disks, each of which can comprise two mapped extents, e.g., that correspond to real portions of a real disk(s) of a real node(s) of a real cluster(s), such as real cluster 302 of FIG. 3, etc. The example illustrated mapped cluster 460 can comprise 64 mapped extents, of which, half can be in use, e.g., 50% of mapped cluster 460 can be occupied mapped extents. This example can illustrate waste of computing resources were some MCSS instances, e.g., an MCSS instance for mapped node, can be sub-optimal, such as, not supporting as many occupied extents as a more optimized MCSS instance. As an example, mn 7 of mapped cluster 460 can be associated with an instance of an MCSS that consumes computing resources to manage zero occupied mapped extents. As another example, mn 5 of mapped cluster 460 can be associated with another MCSS instance that consumes computing resources but only manages two of eight possible occupied mapped extents. In an aspect, contracting mapped cluster 460 can result in fewer MCSS instances supporting mapped nodes with a higher ratio of occupied to unoccupied mapped extents, e.g., a greater percentage of each mapped node can comprise occupied mapped extents, which can be associated with a more optimal MCSS instance relative to expenditure of computing resources. As a non-illustrated example, it can be more optimal to run one MCSS instance supporting one mapped node of eight occupied mapped extents than it can be to run eight MCSS instances each supporting one mapped node of one occupied mapped extent.

System 400 can undergo contraction, which can result in contracting mapped cluster 460 into mapped cluster 462. Mapped cluster 462 illustrates an example contraction that can comprise four mapped nodes each supporting eight occupied mapped extents. In an embodiment, mapped cluster 462 can comprise four MCSS instances in contrast to mapped cluster 460 supporting, for example, eight MCSS instance, while mapped cluster 462 can still support the same count of occupied extents as mapped cluster 460, e.g., both 460 and 462 support 32 occupied mapped extents. In an aspect, the physical location of data stored in the real cluster can remain the same for both mapped cluster 460 and mapped cluster 462, e.g., in an embodiment, only the mapping of the mapped cluster 460 can be updated to generate mapped cluster 462.

Contraction of mapped cluster 460 into mapped cluster 462 can appear to quickly improve the optimization of a doubly mapped cluster, e.g., contraction can result in improved use of computing resources by reducing the count of mapped nodes and/or MCSS instances, etc., while still offering access to the same data without need to reshuffle the physical storage locations of the data.

However, where the data stored according to a doubly mapped cluster scheme is remapped, data protection sets can be antagonized. Anatomization of a data protection set can result in reduced access to data. As an example, where a data protection set is distributed appropriately in mapped cluster 460, access to data in the event of reduced access to a mapped node, e.g., a mapped node failure, network issues, planned/unplanned maintenance, etc., can be maintained via use of redundancy afforded by other portions of the data protection set stored at other mapped nodes. As an example, where a 12+4 erasure coding scheme generates 16 protection set fragments that can be stored as two fragments per each of eight mapped nodes, then the loss of any two mapped nodes would not cause loss of access to the corresponding data because at least twelve of the 16 protection set fragments are still accessible via the remaining six mapped nodes, e.g., a 12+4 protection set can ensure access to the protected data up to the loss of any four of the protection set fragments.

In an embodiment, continuing the above example, where contraction result is six protection sets fragments being stored in one mapped node, then the loss of just the one mapped node can result in the data being less accessible. This can be caused by more than four protection set fragments being unavailable where the protection set only ensures access where up to four protection set fragments become less accessible. As an example, where mapped cluster 460 can be contracted into mapped cluster 462, where mapped extent 5.1.1 and 6.1.2 of mapped cluster 460 each comprise two protection set fragments and the extents of mn 1 of mapped cluster 460 already comprises two protection set fragments, then contraction to mapped cluster 462 can result in mn 1 of mapped cluster 462 having six protection set fragments via remapping mapped extents 5.1.1 and 6.1.2 respectively from mn 5 and mn 6 of mapped cluster 460 into mn 1 of mapped cluster 462. This can put data at risk of becoming less accessible in the event of mn 1 becoming less available, e.g., restarting the MCSS of mn 1 of mapped cluster 462 can cause the data to become inaccessible until the MCSS is up and running again, etc. As such, this example can demonstrate that consideration of protection schema can be important in contracting a doubly mapped cluster.

Figure 5:
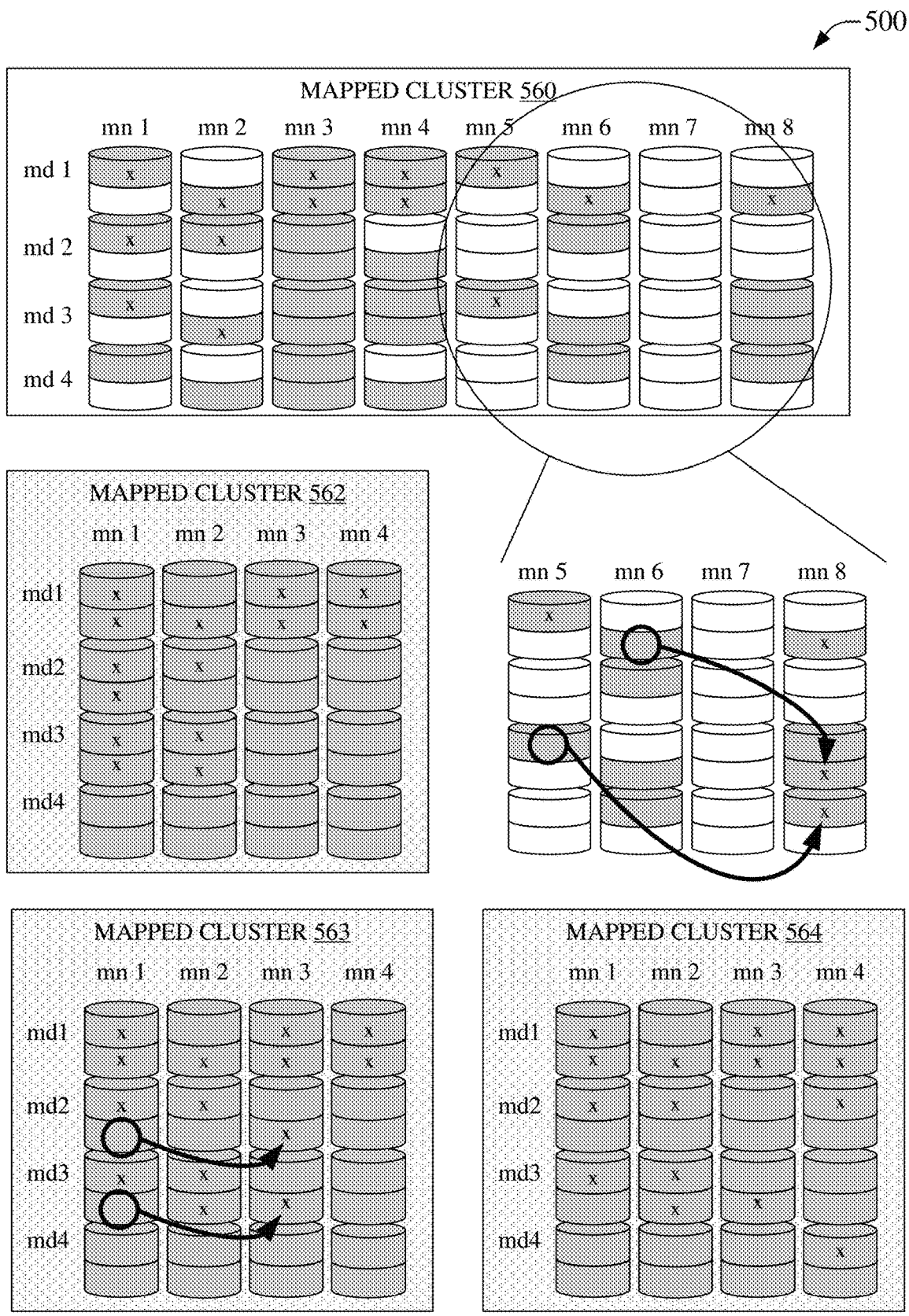
FIG. 5 is an illustration of an example system that can support contraction of a doubly mapped cluster in a manner that accounts for preservation of a data protection set, in accordance with aspects of the subject disclosure.

FIG. 5 is an illustration of example system 500 that can facilitate contraction of a doubly mapped cluster in a manner that supports preservation of a data protection set, in accordance with aspects of the subject disclosure. System 500 can comprise a doubly mapped cluster, e.g., mapped cluster 560, that can be supported via a real cluster that can be the same as, or similar to, at least a portion of cluster storage construct 102, cluster storage construct 202, real cluster 302, etc. In an embodiment, mapped cluster 560 can be the same as, or similar to, mapped cluster 460 of system 400, etc. As previously disclosed, a doubly mapped cluster can comprise mapped nodes of mapped disks of mapped extents, illustrated for mapped cluster 560 as eight mapped nodes, each of which can comprise four mapped disks, each of which can comprise two mapped extents. The example illustrated mapped cluster 560 can comprise 64 mapped extents, of which, half can be in use, e.g., 50% of mapped cluster 460 can be occupied mapped extents. This example can illustrate a use of computing resources that can be optimized, e.g., mapped cluster 560 can be contracted to yield a higher ratio of occupied to unoccupied mapped extents, a greater percentage of each mapped node comprising occupied mapped extents, etc.

In an aspect, mapped cluster 560 can illustrate distribution of portions of a protection set, e.g., as 'x', for example a 12+4 erasure coding scheme can be used to generate a protection set having 16 fragments, wherein the data can remain accessible up to the loss of any four of the 16 fragments. Accordingly, in this example, a data can be encoded in to 16 protection set fragments distributed as illustrated, e.g., three in mn 1, three in mn 2, two in mn 3, two in mn 4, two in mn 5, one in mn 6, and one in mn 8. In this example, the loss of both mn 1 and mn 8 would not compromise access to the data of the protection set because only four of the 16 fragments would become less available. Similarly, again in this example, each of 1) loss of mn 3, mn 6, and mn 8; 2) loss of mn 1; 3) loss of mn 3 and mn 4; 4) loss of mn 3 and mn 5; etc., would all also be tolerable and data would remain accessible.

Upon contraction of mapped cluster 560, for example into mapped cluster 562, the distribution of protection set fragments among the mapped nodes can be altered. In the example of mapped cluster 562, the resulting distribution of mapped extents can be favorable to improved optimization of used computing resources, but can put data at risk by not accounting for the data protection set fragment distribution. In mapped cluster 562, this can be seen in mn 1 now comprising six data protection set fragments, for example where mapped cluster 562 results from a contraction that is the same as, or similar to, the contraction of mapped cluster 460 into mapped cluster 462 in system 400, etc. It can be desirable to contract a doubly mapped cluster in a manner that preserves the efficacy of a protection set(s) stored according to the mapped extents. It is noted that because the data is physically written to, stored in, etc., a real storage location of a real storage device of a real cluster, loss of, or reduced access to, a portion of a mapped cluster typically will not cause an actual data loss event, but rather, can compromise access to the data where a mapped node can become less available and thus can affect access to, or interaction with, corresponding real storage locations of the relevant data, e.g., restarting MCSS for a mapped node can frustrate access to data protection set fragments, sometimes sufficiently to impair access to data, although the data itself would typically not be compromised at the physical storage level on the real cluster components. In an aspect, loss of a real node can affect portions of one or more mapped nodes and it is generally desirable to have well distributed real and mapped storage of protection set fragments.

Issues with frustrating proper distribution of data protection set fragments during a contraction event can be addressed in different manners. In an aspect, a contract-then-move (CTM) scheme can be employed. Use of a CTM scheme can result in first contracting a doubly mapped cluster, which can initially put a protection set(s) at risk, e.g., from mapped cluster 560 to mapped cluster 562. The contracted cluster, e.g., mapped cluster 562, can then be analyzed to determine if a protection set(s) is at risk. Compromised protection set fragments can be further remapped to other mapped nodes of the contracted mapped cluster, e.g., contracted mapped cluster 562 can be further updated to move two protection set fragments from mn 1 to mn 3, for example, resulting in mapped cluster 463 that has ameliorated the risk to the illustrated example protection set because loss of any one mapped node of mapped cluster 463 would not compromise more than four of the 16 example protection set fragments. The CTM scheme can be viewed as quickly contracting a doubly mapped cluster and then cleaning up resulting protection set distribution(s).

In another aspect, a move-then-contract (MTC) scheme can be employed. Use of a MTC scheme can comprise determining possible outcomes of a contraction event to a) find a contraction scheme that does not result in compromising any data protection sets, and/or b) find a contraction scheme that results in fewer protection set distribution issues than other contraction schema. Where a contraction scheme does not result in compromising any data protection sets, this scheme can be implemented to contract a doubly mapped cluster. However, where a contraction scheme does result in compromising any data protection sets, it can be desirable to perform fewer operations to modify the contraction scheme to provide protection set integrity.

Accordingly, a contraction scheme having fewer resulting protection set distribution issues can be selected. This selected scheme can then be modified to proactively move a protection set fragment(s) prior to contraction such that after contraction the integrity of the protection set(s) is maintained. The flyout of mapped cluster 560 can be illustrative of a MTC scheme. Where contraction of mapped cluster 560 to mapped cluster 562 can result in frustration of a data protection set, it can be determined that, for example, moving two data protection set fragments can result in mapped cluster 564 after contraction and, accordingly in the flyout, two data protection set fragments can be moved prior to the contraction event being initiated. It is noted that movement of the two protection set fragments illustrated in the flyout does not compromise the integrity of the data protection set either prior to or after the contraction, e.g., the protection set remains valid in mapped cluster 560 after moving the fragments and before contraction, and further, after contraction to mapped cluster 564 is also valid. The MTC scheme can be viewed as reorganizing data protection set distribution prior to contraction to avoid putting a protection set at risk. In an aspect, the MTC scheme can be compressed by determining movement of data protection set fragments to provide a sound contracted mapped cluster and then moving said fragments in conjunction with contracting a doubly mapped cluster, rather than as two discrete process of first moving without contracting and then contracting without further moving. In some embodiments, combinations of CTM and MTC schemes can be employed, for example, applying CTM to some data protection sets and MTC to other data protection sets as part of contracting a doubly mapped cluster. These mixed embodiments are considered within the scope of the instant disclosure even where they are not further explicitly described for the sake of clarity and brevity.

Figure 6:
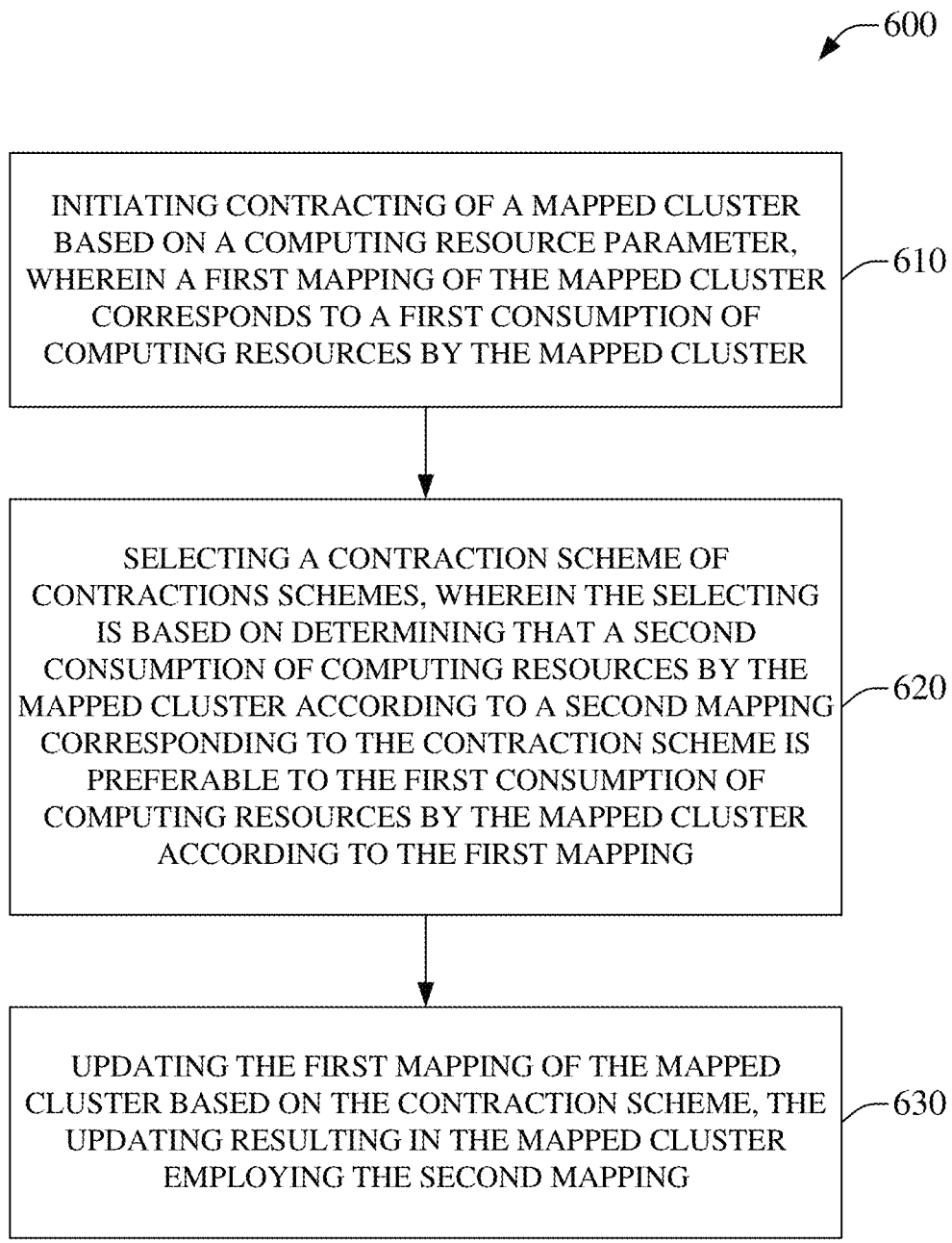
FIG. 6 is an illustration of an example method facilitating contraction of a doubly mapped cluster, in accordance with aspects of the subject disclosure.
Figure 7:
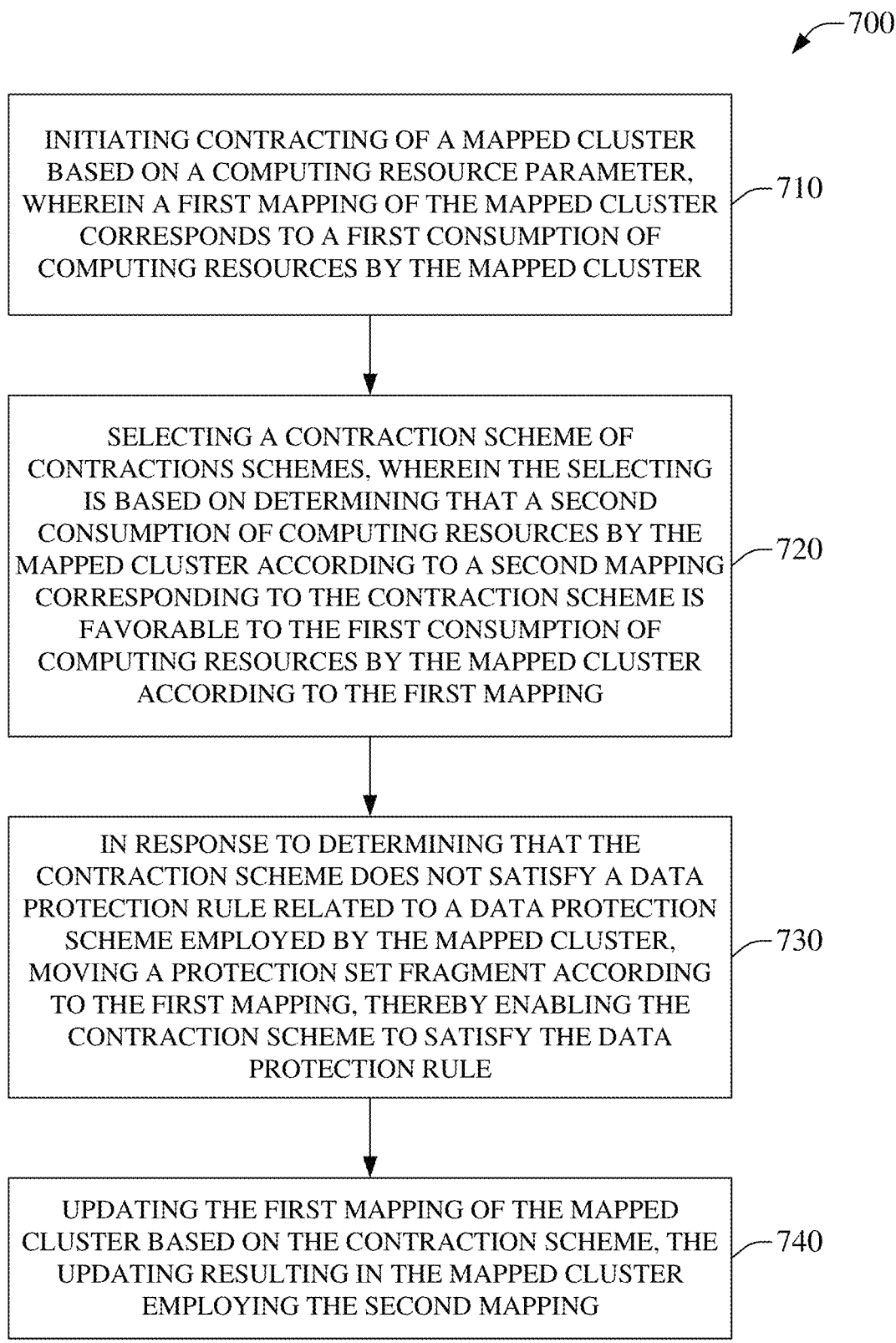
FIG. 7 is an illustration of an example method enabling contraction of a doubly mapped cluster with data protection set preservation via a move-then-contract scheme, in accordance with aspects of the subject disclosure.
Figure 8:
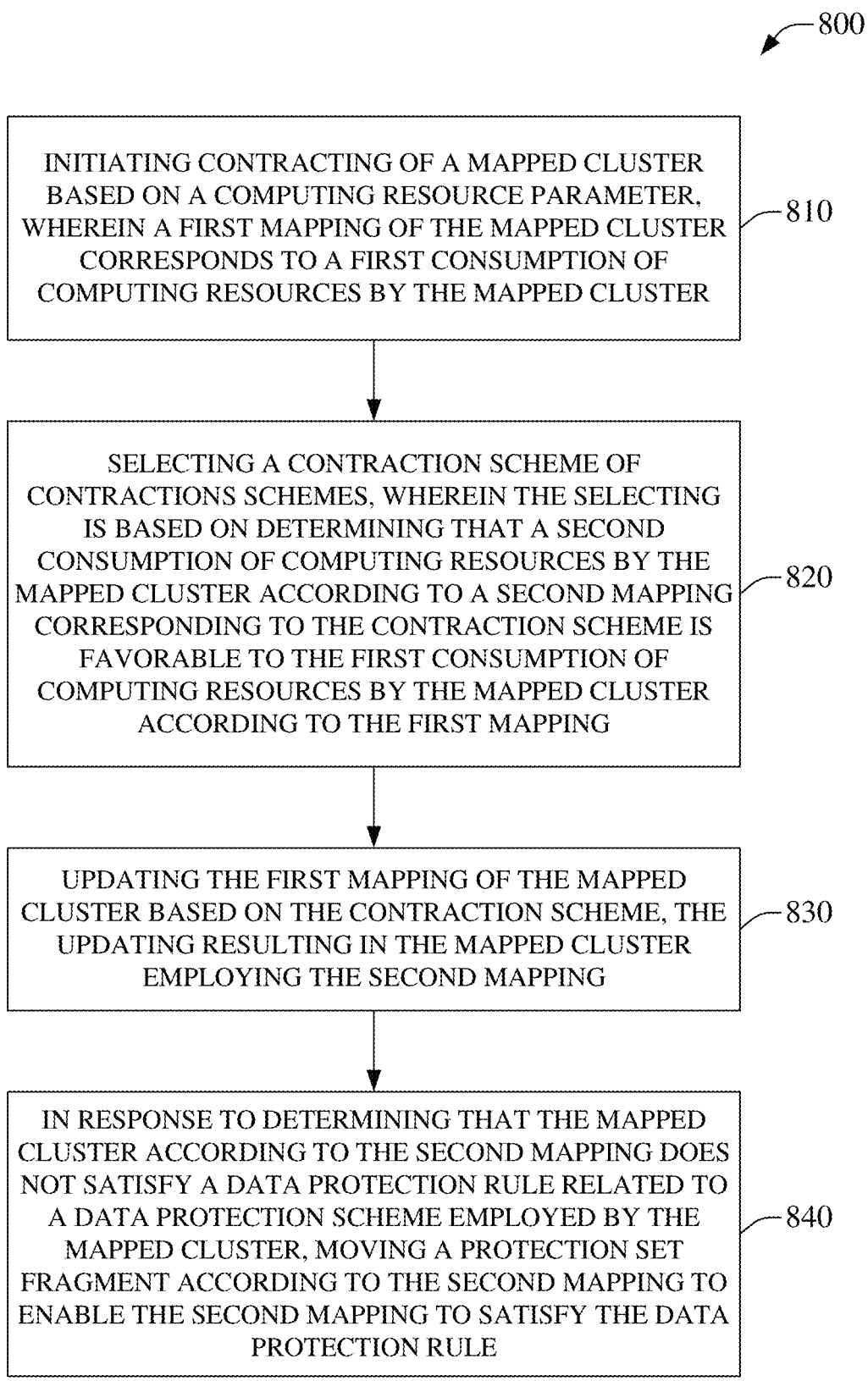
FIG. 8 illustrates an example method facilitating contraction of a doubly mapped cluster with data protection set preservation via a contract-then-move scheme, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate contraction of a doubly mapped cluster, in accordance with aspects of the subject disclosure. Method 600, at 610, can comprise initiating contraction of a mapped cluster, e.g., doubly mapped cluster such as mapped cluster 360, 460, 560, etc., based on a computing resource parameter. In an aspect, a first mapping of the mapped cluster can correspond to a first consumption of computing resources by the mapped cluster, e.g., the first mapping can correspond to an instance of an MCSS supporting a mapped node that has zero occupied mapped extents/disks, such as mn 7 of mapped cluster 560 in system 500, etc., wherein the example MCSS instance can be vastly underutilized. In an aspect, a computing resource parameter can be monitored such that it can be determined if the parameter transitions a selectable threshold level. As an example, a threshold can indicate a number of processor operations, number of data access events via an instance of a MCSS, etc., such that where a corresponding computing resource parameter transitions the threshold, for example, an instance of an MCSS accesses stored data below a threshold level, which can indicate underutilization of the MCSS, a contraction can be initiated. In an aspect, the initiation of the contraction can be based on an average, moving average, etc., of the computing resource parameter, on more than one computing resource parameter, multiple threshold levels, etc., to allow, for example, contraction to occur only after the computer parameter demonstrates a sufficiently consistent indication of underutilization, etc. As another example, use of more than one parameter to trigger contraction can avoid causing a contraction where one of the parameters transitions a corresponding threshold for reasons that can be unrelated to underutilization, for example a software bug, hardware failure, etc.

At 620, method 600 can comprise selecting a contraction scheme. The contraction scheme can be one of several contraction schema that can support contraction of a doubly mapped cluster, e.g., different contraction permutations can be possible and can result in a same, similar, or dissimilar contracted doubly mapped cluster. Accordingly, a contraction scheme can be selected to achieve a preferred resulting contracted doubly mapped cluster based on one or more criteria related to the effect(s) of the contraction according to the various contraction schema. As such, the selecting the contracting scheme can be based on determining that a second consumption of computing resources by the mapped cluster according to a second mapping corresponding the selected contraction scheme is preferable to the first consumption of computing resources by the mapped cluster according to the first mapping at 610. As an example, it can be preferable to not have an MCSS instance supporting a mapped node that has no occupied extents, e.g., mn 7 of mapped cluster 560 in system 500, etc., and as such, a contraction scheme that removes mn 7 from a resulting contracted mapped cluster can be preferred over another contraction scheme that, for example, does not remove mn 7. In an aspect, the schema can be ranked according to different criteria to enable selection according to a criterion. As examples, the schema can be ranked according to predicted use of computing resources, according to a number of protection set preservation operations, e.g., how many protection set fragments need to be moved as part of the contraction to maintain the integrity of a protection set, etc., according to a count of operations in a real cluster that will be used to implement a contraction, etc. Selection of a contraction scheme can be based on these types of various rankings, for example, two schemes that have a same rank of predicted computing resource use can be differentiated based on a rank of data protection preservation operations, etc., such that, for example, a first scheme that has no preservation operations can be selected over a scheme that has two preservation operations even where both schema are predicted to have a same level of improvement in computer resource utilization.

Method 600, at 630, can comprise updating the first mapping of the mapped cluster based on the contraction scheme and can result in the mapped cluster, after contraction, employing the second mapping. At this point, method 600 can end. As an example, a selected contraction scheme can indicate that mapped cluster 462 will result from contraction of mapped cluster 460 and, where this is result is preferable over other results corresponding to other contraction schema at 620, mapping of mapped cluster 460 can be updated at 630 to cause mapped cluster 460 to be contracted into mapped cluster 462.

In an aspect, method 600, as applied to system 400, can result in possible frustration of a data protection set(s), as is noted elsewhere herein. Accordingly, selection of a contraction scheme, e.g., at 620 in some embodiments, can comprise selecting contraction scheme that does not frustrate a protection set(s), e.g., by finding a contraction scheme that directly does not frustrate a protection set(s), a contraction scheme that employs a CTM scheme and/or a MTC scheme, etc., as is also disclosed herein above.

FIG. 7 is an illustration of an example method 700, facilitating contraction of a doubly mapped cluster with data protection set preservation via a move-then-contract scheme, in accordance with aspects of the subject disclosure. At 710, method 700 can comprise initiating contraction of a mapped cluster based on a computing resource parameter. In an aspect, a first mapping of the mapped cluster can correspond to a first consumption of computing resources by the mapped cluster. Whereas a computing resource parameter can be monitored, it can be determined that the parameter has transitioned a selectable threshold level to trigger a contraction.

At 720, method 700 can comprise selecting a contraction scheme of contraction schemes. A contraction scheme can be selected to achieve a preferred result. In an aspect, the selecting can be based on determining that a second consumption of computing resources by the mapped cluster according to a second mapping corresponding to the selected contraction scheme is favorable to the first consumption of computing resources by the mapped cluster according to the first mapping at 710.

At 730, method 700 can comprise moving a protection set fragment of the first mapping. Moving the protection set fragment can be in response to determining that the contraction scheme does not satisfy a data protection rule related to a data protection scheme employed by the mapped cluster. In an aspect, the moving can therefore occur after selection of the contraction scheme but before the contraction scheme is implemented. In an aspect, this can be viewed as method 700 employing a MTC scheme as disclosed elsewhere herein. The MTC scheme can serve to prevent even limited exposure of a protection set to a condition where access to data could be limited, e.g., by moving protection set fragments prior to the contraction, the protection set remains viable both before and after the contraction has occurred, thereby limiting possible lowered availability of access to the data of the protection set. In an aspect, moving the protection set fragment prior to contraction can enable the selected contraction scheme to comport with, satisfy, etc., the data protection rule.

Method 700, at 740, can comprise updating the first mapping of the mapped cluster based on the selected contraction scheme after an appropriate data protection set fragment(s) is moved, which can result in the mapped cluster employing the second mapping without exposing a data protection set to vulnerability. At this point, method 700 can end. As an example, a selected contraction scheme can indicate that mapped cluster 562 will result from contraction of mapped cluster 560 and can cause movement of data protection set fragments before contraction is implemented, for example as indicated in the flyout of mapped cluster 560, such that after implementing the contraction, mapped cluster 564 results. In an aspect, method 700, as applied to system 500, can result in avoiding frustration of a data protection set(s), as is noted elsewhere herein.

FIG. 8 is an illustration of an example method 800, which can enable contraction of a doubly mapped cluster with data protection set preservation via a contract-then-move scheme, in accordance with aspects of the subject disclosure. At 810, method 800 can comprise initiating contraction of a mapped cluster based on a computing resource parameter. In an aspect, a first mapping of the mapped cluster can correspond to a first consumption of computing resources by the mapped cluster. Whereas a computing resource parameter can be monitored, it can be determined that the parameter has transitioned a selectable threshold level to trigger a contraction.

At 820, method 800 can comprise selecting a contraction scheme of contraction schemes. A contraction scheme can be selected to achieve a preferred result. In an aspect, the selecting can be based on determining that a second consumption of computing resources by the mapped cluster according to a second mapping corresponding to the selected contraction scheme is favorable to the first consumption of computing resources by the mapped cluster according to the first mapping at 810.

At 830, method 800 can comprise updating the first mapping of the mapped cluster based on the selected contraction scheme before a data protection set fragment(s) is moved, which can result in the mapped cluster employing the second mapping with possible exposure of a data protection set to vulnerability. As an example, a selected contraction scheme can indicate that mapped cluster 562 will result from contraction of mapped cluster 560. Method 800 can, at 830, cause contraction of mapped cluster 560 even though the resulting mapped cluster 562 will comprise a vulnerable protection set In an aspect, method 800, as applied to system 500, can result in quickly causing contraction and then later resolving any frustration of a data protection set(s), as is noted elsewhere herein.

Method 800, at 840, can comprise moving a protection set fragment of the second mapping. At this point, method 800 can end. Moving the protection set fragment can be in response to determining that the mapped cluster, for example mapped cluster 562, etc., according to the second mapping does not satisfy a data protection rule related to a data protection scheme employed by the mapped cluster, e.g., after contraction. In an aspect, the moving can therefore occur after implementation of the selected contraction scheme. In an aspect, this can be viewed as method 800 employing a CTM scheme as disclosed elsewhere herein. The CTM scheme can serve to accelerate contraction at the risk of exposing a protection set to a condition where access to data could be limited, e.g., by moving protection set fragments after the contraction, the protection set can be vulnerable for a period between the contraction occurring and a corrective action occurring. This can be preferred in some situations, for example, where the customer data is of low value, where the risk of an MCSS instance restarting is low, etc., it can be more valuable to cause the contraction to better utilize computing resources than to first ensure all data will be fully protected. This can be more especially true where the real data storage remains uncompromised and a real data loss event would not occur as a result of the remapping resulting from the contraction of the doubly mapped cluster.

Figure 9:
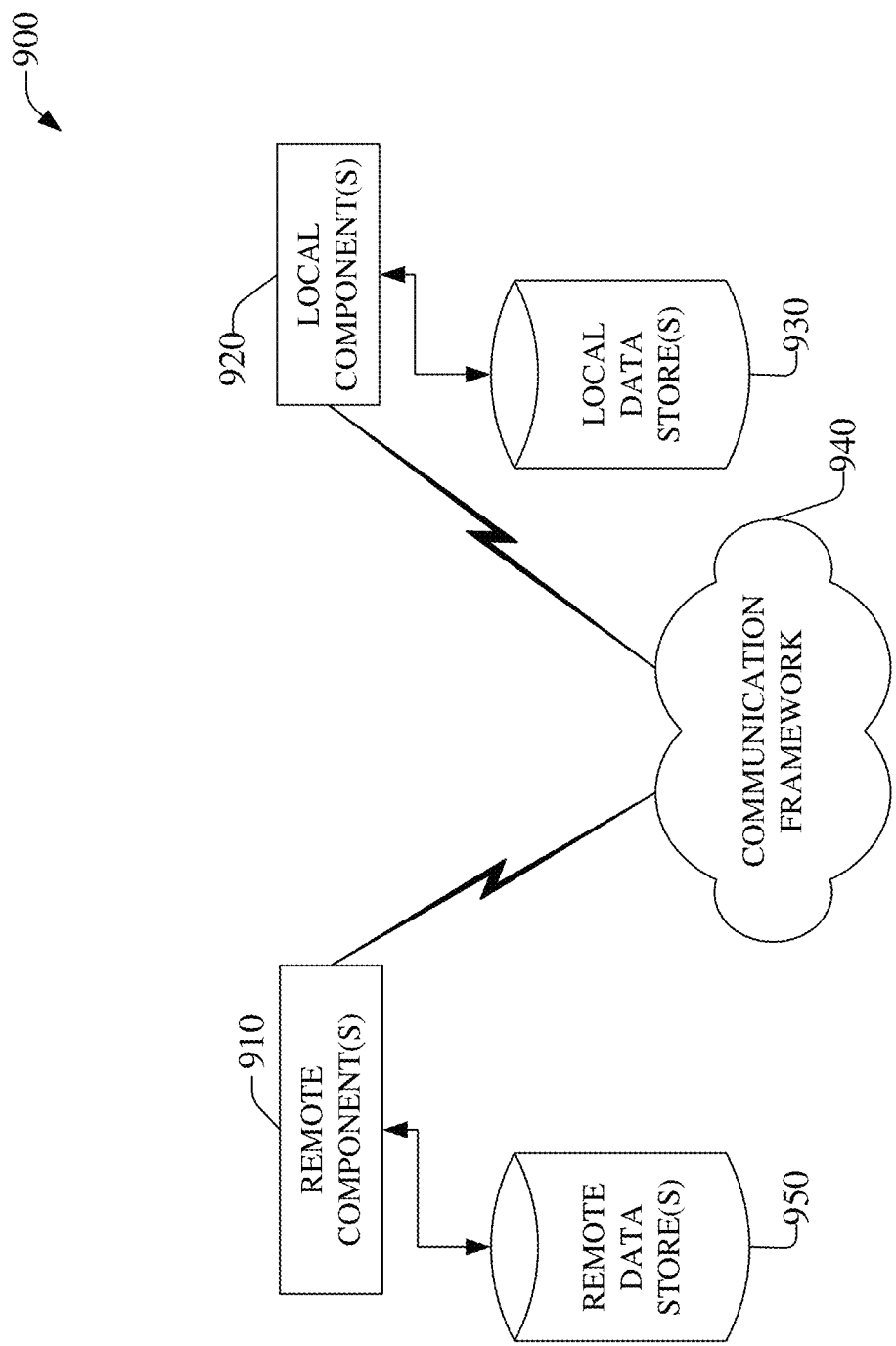
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be real nodes, e.g., 120-128, etc., of a real cluster 110-118, etc., in communication with other real nodes, e.g., 120-128, etc., of the real cluster 110-118, etc., that can be located in a different physical location, e.g., Seattle and Moscow, etc. Communication framework 940 can comprise wired network devices, wireless network devices, mobile devices, wearable devices, radio access network devices, gateway devices, femtocell devices, servers, etc. In an aspect, a real cluster can be comprised of physically disparate devices, e.g., a real cluster can comprise devices in entirely different data centers, different cities, different states, different countries, etc.

The system 900 also comprises one or more local component(s) 920. The local component(s) 920 can be hardware and/or software (e.g., threads, processes, computing devices), e.g., disks 130-138, 140-148, etc., MCSS instances via MCSS component 224, etc., doubly mapped cluster 260, 360, 460-462, etc. In some embodiments, local component(s) 920 can be real nodes, e.g., 120-128, etc., of a real cluster 110-118, etc., in communication with other real nodes, e.g., 120-128, etc., of the real cluster 110-118, etc., that can be located in a different physical location.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, remote and local real nodes can communicate KPIs, move stored data between local and remote real nodes, such as when a mapping of mapped clusters to a real cluster is updated based on affinity score, etc.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct 102, 202, 502, etc., e.g., in the nodes thereof, comprise in mapped cluster control component 220, 310, 520, etc., or comprised in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising triggering contraction of a doubly mapped cluster based on a first computer resource parameter, selecting a contraction scheme based on a rank of the contraction scheme, wherein the rank is based on a difference between the first computer resource parameter and a predicted second computer resource parameter, and updating, according to the contraction scheme, the doubly mapped cluster by transitioning from the first mapping to a second mapping, as is disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
initiating, based on a first computer resource parameter, contraction of a doubly mapped cluster employing a first mapping scheme;
selecting a contraction scheme based on a difference between the first computer resource parameter and a second computer resource parameter, wherein the second computer resource parameter is predicted based on substituting a second mapping scheme for the first mapping scheme employed by the doubly mapped cluster, and wherein the second mapping scheme corresponds to the contraction scheme; and
updating the doubly mapped cluster to employ the second mapping in place of the first mapping.

2. The system of claim 1, wherein the operations further comprise:
moving a data protection set fragment of a data protection set to a different logical location in the doubly mapped cluster according to the first mapping scheme prior to the updating the doubly mapped cluster to employ the second mapping in place of the first mapping.

3. The system of claim 2, wherein the moving the data protection set fragment prior to the updating the doubly mapped cluster is in response to at least determining that the integrity of the data protection set is preserved prior to the updating the doubly mapped cluster to employ the second mapping in place of the first mapping.

4. The system of claim 2, wherein the moving the data protection set fragment prior to the updating the doubly mapped cluster is in response to at least determining that the integrity of the data protection set will be preserved after the updating the doubly mapped cluster to employ the second mapping in place of the first mapping.

5. The system of claim 2, wherein the data protection set corresponds to a 12+4 erasure coding scheme.

6. The system of claim 2, wherein the data protection set corresponds to a 10+2 erasure coding scheme.

7. The system of claim 1, wherein the operations further comprise:
moving a data protection set fragment to a different logical location in the doubly mapped cluster according to the second mapping scheme after the updating the doubly mapped cluster to employ the second mapping in place of the first mapping.

8. The system of claim 7, wherein prior to the moving the data protection set fragment the integrity of the data protection set is compromised by the updating the doubly mapped cluster to employ the second mapping in place of the first mapping.

9. The system of claim 8, wherein after the moving the data protection set fragment the integrity of the data protection set is restored.

10. The system of claim 1, wherein the updating the doubly mapped cluster to employ the second mapping in place of the first mapping comprises moving no corresponding data stored in a real cluster.

11. The system of claim 1, wherein the updating the doubly mapped cluster to employ the second mapping in place of the first mapping comprises moving at least some corresponding data stored in a real cluster.

12. The system of claim 1, wherein the operations further comprise releasing at least one mapped node of the doubly mapped cluster, resulting in the doubly mapped cluster comprising at least one fewer mapped nodes after the contraction of the doubly mapped cluster than before the contraction of the doubly mapped cluster.

13. A method, comprising:
in response to determining, by a system comprising a processor, that a first computer resource parameter does not satisfy a rule related to a threshold value, triggering contraction of a doubly mapped cluster employing a first mapping scheme;

ranking, by the system, a contraction scheme among contraction schemes, wherein the ranking is based, at least in part, on a difference between the first computer resource parameter and a second computer resource parameter, wherein the second computer resource parameter is predicted based on the doubly mapped cluster employing a second mapping scheme, and wherein the second mapping scheme is indicated by the contraction scheme; and in response to selecting, by the system, the contraction scheme based on the rank, updating the doubly mapped cluster by transitioning from a first mapping according to the first mapping scheme to a second mapping according to the second mapping scheme.

14. The method of claim 13, further comprising:

causing, by the system, movement of a data protection set fragment of a data protection set to a different logical location in the doubly mapped cluster according to the first mapping scheme prior to the updating the doubly mapped cluster, wherein the movement of the data protection set fragment to the different logical location results in the data protection set satisfying a fragment distribution rule related to an integrity of the data protection set before the updating the doubly mapped cluster.

15. The method of claim 13, further comprising:

causing, by the system, movement of a data protection set fragment of a data protection set to a different logical location in the doubly mapped cluster according to the first mapping scheme prior to the updating the doubly mapped cluster, wherein the movement of the data protection set fragment to the different logical location results in the data protection set satisfying a fragment distribution rule related to an integrity of the data protection set after the updating the doubly mapped cluster.

16. The method of claim 13, further comprising:

causing, by the system, movement of a data protection set fragment of a data protection set to a different logical location in the doubly mapped cluster according to the second mapping scheme after the updating the doubly mapped cluster, wherein the movement of the data protection set fragment to the different logical location results in the data protection set satisfying a fragment distribution rule related to an integrity of the data protection set after the updating the doubly mapped cluster.

17. A non-transitory machine-readable medium, comprising executable instructions that, when executed by a processor, facilitate performance of operations, comprising:

triggering, based on a first computer resource parameter, contraction of a doubly mapped cluster employing a first mapping scheme;

selecting a contraction scheme based on a rank of the contraction scheme among possible contraction schemes, wherein the rank is based, at least in part, on a difference between the first computer resource parameter and a second computer resource parameter, wherein the second computer resource parameter is predicted based on the doubly mapped cluster employing a second mapping scheme in lieu of the first mapping scheme, and wherein the second mapping scheme corresponds to the contraction scheme; and updating, according to the contraction scheme, the doubly mapped cluster by transitioning from a first mapping according to the first mapping scheme to a second mapping according to the second mapping scheme.

18. The non-transitory machine-readable medium of claim 17, wherein, the operations further comprise:

initiating movement of a data protection set fragment of a data protection set to a different logical location in the doubly mapped cluster according to the first mapping scheme prior to the updating the doubly mapped cluster, wherein the data protection set is determined to satisfy a fragment distribution rule related to an integrity of the data protection set after the movement of the data protection set fragment and before the updating the doubly mapped cluster.

19. The non-transitory machine-readable medium of claim 17, wherein, the operations further comprise:

initiating movement of a data protection set fragment of a data protection set to a different logical location in the doubly mapped cluster according to the first mapping scheme prior to the updating the doubly mapped cluster, wherein the data protection set is determined to satisfy a fragment distribution rule related to an integrity of the data protection set after the movement of the data protection set fragment and after the updating the doubly mapped cluster.

20. The non-transitory machine-readable medium of claim 17, wherein, the operations further comprise:

initiating movement of a data protection set fragment of a data protection set to a different logical location in the doubly mapped cluster according to the second mapping scheme after the updating the doubly mapped cluster, wherein the data protection set is determined to satisfy a fragment distribution rule related to an integrity of the data protection set after the updating the doubly mapped cluster and after the movement of the data protection set fragment.

* * * * *